United States Patent
Andros et al.

(10) Patent No.: US 9,204,589 B2
(45) Date of Patent: Dec. 8, 2015

(54) DEVICE AND METHOD FOR SEPARATING PLANT MATERIAL FROM A BED OF PLANTS

(71) Applicants: Matthew James Andros, Santa Margarita, CA (US); Garett John Stapp, San Juis Obispo, CA (US); Thomas Klippenstein, Paso Robles, CA (US); Harrison Honerkamp, Paso Robles, CA (US)

(72) Inventors: Matthew James Andros, Santa Margarita, CA (US); Garett John Stapp, San Juis Obispo, CA (US); Thomas Klippenstein, Paso Robles, CA (US); Harrison Honerkamp, Paso Robles, CA (US)

(73) Assignee: Andros Engineering, Paso Robles, CA (US)

( * ) Notice: Subject to any disclaimer, the term of this patent is extended or adjusted under 35 U.S.C. 154(b) by 0 days.

(21) Appl. No.: 14/209,831

(22) Filed: Mar. 13, 2014

(65) Prior Publication Data

US 2014/0299340 A1    Oct. 9, 2014

Related U.S. Application Data

(60) Provisional application No. 61/780,729, filed on Mar. 13, 2013.

(51) Int. Cl.
| | |
|---|---|
| *A01B 33/00* | (2006.01) |
| *A01B 49/02* | (2006.01) |
| *A01B 39/08* | (2006.01) |
| *A01B 39/12* | (2006.01) |

(52) U.S. Cl.
CPC ............... *A01B 49/022* (2013.01); *A01B 39/08* (2013.01); *A01B 39/12* (2013.01)

(58) Field of Classification Search
CPC ... A01D 33/144; A01D 34/412; A01D 34/60; A01D 34/435; A01D 34/535; A01D 41/16; A01D 43/08; A01B 33/14; A01B 39/08; A01B 39/12; A01B 49/022
USPC ............... 56/156, 13.9, 294, 505, 320.1, 249, 56/11.9; 172/45, 91, 95.123, 125, 556, 1
See application file for complete search history.

(56) References Cited

U.S. PATENT DOCUMENTS

| | | | |
|---|---|---|---|
| 1,586,169 A | 5/1926 | Webb et al. | |
| 1,954,593 A | 4/1934 | Kuly | |

(Continued)

FOREIGN PATENT DOCUMENTS

| | | |
|---|---|---|
| CA | 2069081 A1 | 11/1993 |
| CA | 2089705 A1 | 11/1993 |

(Continued)

*Primary Examiner* — Robert Pezzuto
(74) *Attorney, Agent, or Firm* — R. Scott Kimsey, Esq.; Klein DeNatale Goldner

(57) ABSTRACT

A device for removing plants or portions of plants from the plant bed includes a frame having forward and rearward ends, and first and second containment coulters attached to the frame in side-by-side alignment. The first and second containment coulters define a space between them. A rotary cutter is rotatably attached to the frame rearward of the first and second containment coulters. A portion of the rotary cutter extends into the space between the first and second containment coulters. The rotary cutter includes a plurality of teeth along a peripheral edge thereof. A shroud is attached to the frame and extends over at least a portion of the containment coulter pair and the rotary cutter. The shroud includes side walls that extend downward from the top of the shroud along at least a portion of the height of the pair of containment coulters and the rotary cutter.

18 Claims, 22 Drawing Sheets

(56) References Cited

U.S. PATENT DOCUMENTS

| | | | |
|---|---|---|---|
| 2,087,091 A | 7/1937 | Joost | |
| 2,788,725 A | 4/1957 | Wilkey et al. | |
| 2,836,026 A | 5/1958 | Gray et al. | |
| 3,162,003 A | 12/1964 | Schapansky | |
| 3,410,350 A | 11/1968 | Ware | |
| 3,693,335 A * | 9/1972 | Mathews | 56/294 |
| 4,187,916 A | 2/1980 | Harden et al. | |
| 4,234,045 A | 11/1980 | Porter | |
| 4,287,708 A | 9/1981 | Neely, Jr. | |
| 4,416,334 A | 11/1983 | Bouillon | |
| 4,616,713 A | 10/1986 | Shattuck | |
| 4,729,435 A | 3/1988 | Urich | |
| 4,804,047 A * | 2/1989 | Kobashi et al. | 172/91 |
| 4,884,391 A | 12/1989 | Cosson | |
| 5,042,240 A | 8/1991 | Rocca et al. | |
| 5,331,907 A | 7/1994 | Beaujot | |
| 5,333,694 A | 8/1994 | Roggenbuck et al. | |
| 5,626,195 A | 5/1997 | Dover | |
| 6,173,559 B1 | 1/2001 | Nevarez, Sr. | |
| 6,363,700 B1 | 4/2002 | Fowler | |
| 6,827,151 B1 | 12/2004 | Winslow | |
| 7,930,872 B2 * | 4/2011 | Trevillyan et al. | 56/249 |
| 2008/0229724 A1 | 9/2008 | Lynes | |

FOREIGN PATENT DOCUMENTS

| | | |
|---|---|---|
| CA | 2069081 C | 1/1996 |
| CA | 2089705 C | 11/2002 |

* cited by examiner

DEVICE AND METHOD FOR SEPARATING PLANT MATERIAL FROM A BED OF PLANTS

RELATED APPLICATIONS

This application claims priority of U.S. Provisional Patent Application No. 61/780,729, filed Mar. 13, 2013 and entitled "Apparatus for Selectively Separating, Pulverizing and Covering Mother Plants from a Bed of Daughter Plants." The prior application is incorporated herein by reference in its entirety.

BACKGROUND OF THE INVENTION

1. Field of the Invention

The present invention relates generally to the selective harvesting of certain plants such as, for example, strawberry and other species and hybrids in the *Fragaria* genus, as well as raspberry and other species and hybrids in the *Rubus* genus. More specifically, the invention relates to an apparatus and method for removing unwanted plants, or unwanted portions of plants, from a plant bed to facilitate more effective harvesting of the desired plants or portions of plants. While the present invention has general applicability to all suitable plant types, including other species and hybrids in the *Rubus* and *Fragaria* genera, because of the broad application to raspberries and strawberries in particular, the present device and method will be detailed with respect to those illustrative plants.

2. Description of the Prior Art

Strawberry plants are commercially propagated by planting "mother plants" in rows and allowing those plants to produce and send out multiple stolons called runners. These horizontal runners are sent outward from the base of the strawberry plants. At variable distances, new strawberry plants called "daughter plants" form at the runner nodes. This is possible due to the strawberry plant's ability to form adventitious specialized roots at the nodes along a runner. Wherever these roots touch nutritious soil, they continue to grow into that soil and establish a new clonal plant, or daughter plant, that is genetically identical to the mother plant that originally formed the runners. These vegetatively propagated plants may be subsequently harvested to be sold to commercial growers producing fruit for consumption.

After adequate chilling below 45° F., the plants start to go dormant and are harvested. The daughter plants will eventually be marketed to commercial growers and transplanted to produce fruit for sale. Under current harvesting practices, all of the plants, including mother and daughter plants alike, are dug, gathered together, and transported en masse to a processing facility where the mother plants are removed from the daughter plants and the daughter plants are graded and packed. The mother plants are discarded.

To date, the separating of the mother plants from the daughter plants, the disposing of the mother plants, and the sorting and packing of the daughter plants, has all been performed manually. Advances in computer-controlled vision and sorting techniques have enabled some mechanical sorting of these plants in the packing shed, thus reducing the significant amount of manual processing required for this sort/pack process. Unfortunately, existing technology has not advanced to the point where a computer vision system can, with 100% accuracy, determine the difference between mother and daughter plants. Allowing some mother plants to escape detection during the computer controlled sorting process greatly reduces the cost effectiveness and efficiency of this automated process because the resulting mother plants must still be removed by human hands.

With the widespread implementation of GPS guidance systems on agricultural tractors, it is now possible to guide an implement (for example a mother plant transplanting machine) along a planting line to sub-inch accuracy. Additionally, these GPS guidance systems have the capability to store this guidance information and allow the tractor and/or implement to go back to the same field at a later date (for example when strawberry plants are ready to be harvested), locate the previous plant line, and follow it with the same level of sub-inch accuracy.

Therefore, using this precise guidance system, the mother plants may be removed from their location in the field before the field is harvested. If these plants can be removed, destroyed, or rendered unharvestable in the field such that the plants are not mixed with the daughter plants, the sorting and packing operation is greatly simplified and the accuracy and through-put of the computer-controlled sorting system is greatly enhanced. As an added benefit, removing the mother plants prior to harvest may provide added benefit to the daughter plants by forcing them to increase root growth as nutrients are no longer being supplied by the mother plants. Finally, if the mother plants can be pulverized and buried with clean soil prior to the harvesting of the daughter plants, further handling and disposal of the mother plants is not required.

Raspberry cultivars readily produce new shoots from the roots of the raspberry plant. In a planting process called "suckering," new nursery plantings are established by taking advantage of the plant's ability to produce these suckers. Commercial nurseries grow plants and harvest roots to supply the plantable rootstocks to fruit growers. As the plants destined for rootstock go dormant in the fall, they are harvested. Prior to the root harvesting process, the dormant plants are mowed down to a height that leaves only a short length of cane protruding from the surface of the planted bed of soil. This short length of cane and the associated woody portion of plant material that forms the transition from cane to roots, the "crown," is left in the bed, and is currently harvested along with the roots. Current practice requires that these crowns be removed as a secondary operation in the packing shed. The crown removal process is currently performed manually. This is a time-consuming and expensive process.

The present invention eliminates the secondary separation operations described above with respect to strawberries and raspberries. The invention mechanically removes unwanted strawberry mother plants or portions of mother plants in situ, before the harvesting operation. The invention may also be used to remove raspberry crowns from a plant bed before the roots are harvested. Similar objectives may be achieved with other plants.

SUMMARY OF THE INVENTION

A device for preparing a plant bed, including removing plants or portions of plants from the plant bed, includes a frame having a forward and rearward end, a first containment coulter attached to the frame, and a second containment coulter attached to the frame in side-by-side alignment with the first containment coulter. The first and second containment coulters define a space between them. A rotary cutter is rotatably attached to the frame rearward of the first and second containment coulters. A portion of the rotary cutter extends into the space between the first and second containment coulters. The rotary cutter includes a plurality of teeth along a peripheral edge thereof. A shroud is attached to the frame and extends over at least a portion of the containment coulter pair and the rotary cutter. The shroud includes side walls that extend downward from the top of the shroud along at least a portion of the height of the pair of containment coulters and the rotary cutter.

The first containment coulter, second containment coulter, rotary cutter, and shroud may constitute a first cutting assembly. The device may include a second cutting assembly having a third containment coulter attached to the frame, a fourth containment coulter attached to the frame in side-by-side arrangement to the third containment coulter, and a second rotary cutter rotatably attached to the frame. A space may be defined between the third and fourth containment coulters, with the second rotary cutter extending at least partially into the space. A second shroud may be attached to the frame having a top extending over at least a portion of the third and fourth containment coulters and the second rotary cutter, and also having first and second opposing side walls extending down from the top along at least a portion of the height of the third and fourth containment coulters. The first cutting assembly is attached to the frame at a first location and the second cutting assembly is attached to the frame at a second location.

The device may include a rotatable shaft engaging the first and second rotary cutters and extending therebetween.

The device may include a chain drive in operative engagement with the rotatable shaft, the chain drive used to rotate said shaft.

The device may include a gear box in operative engagement with the chain drive, the gear box adapted to engage a vehicle power take-off such that the rotation of the rotatable shaft may be actuated by the vehicle power take-off.

The plurality of teeth on the rotary cutter may each have a shape and profile for scooping, carrying, and depositing soil and cut plant material.

The plurality of teeth on the rotary cutter may be provided in alternating left- and right-hand configuration.

The device may include a first guide attached to an interior surface of the first side wall of the shroud, and a second guide attached to an interior surface of the second side wall of the shroud. The first and second guides extend along at least a portion of the length and at least a portion of the height of the containment coulters and rotary cutter.

The device may include a conveyor attached to the frame rearward of the shroud, the conveyor disposed so that plant material removed by the rotary cutter and traveling through the shroud is disposed onto the conveyor. The device may also include a grinder attached to the frame rearward of the conveyor and in communication therewith such that plant material traveling along the conveyor is delivered into the grinder.

The device may include at least one wheel rotatable attached to a wheel support attached to the frame.

The device may include at least one hydraulic cylinder attached to the frame, the hydraulic cylinder operable to raise and lower the frame in relation to the at least on wheel.

A method for preparing a plant bed, including the removal of plants or portions of plants from the bed, includes the step of providing a device that, in a single pass, performs the steps of: a) cutting plant material in the plant bed, scooping soil and the cut plant material from the plant bed, and discharging soil and cut plant material onto the plant bed behind the device.

The device used in the method may include first and second containment coulters with a spaced defined therebetween, a rotary cutter rearward of the containment coulters, and a shroud partially covering the containment coulters and rotary cutter. The step of cutting plant material from the plant bed may be performed by the containment coulters, the step of scooping the cut plant material from the plant bed may be performed by the rotary cutter, and the step of discharging the soil and cut plant material onto the plant bed may be performed by the shroud.

The method may further include that, in a single pass, the device also performs the step of digging a trench along the plant line as the device travels over the plant bed. The step of discharging soil and cut plant material may include the additional steps of first discharging cut plant material into the trench in the plant bed, and then discharging soil onto the cut plant material in the trench in the plant bed.

A device for preparing a plant bed may also include a pair of containment coulters that are adjustable relative to one another so that the space defined between the two containment coulters may be adjusted.

The distance between the two opposing side walls of the shroud may also be adjustable.

The first and second containment coulters, rotary cutter, and shroud may make up a cutting assembly with a forward end and a rearward end. The forward end of the cutting assembly may be detached from the frame while the rearward end is pivotably attached to the frame. This allows the cutting assembly to pivot upward when it encounters an obstruction in the plant bed.

A wheel may be provided, the wheel pivotably attached to the frame. A hydraulic cylinder may engage the wheel and the frame and allow for adjustment of the height of the frame with respect to the wheel.

The shroud may have a forward end and a rearward end, and the device may include a containment shield attached to the forward end of the shroud.

The one or more cutting assemblies of the device may be slidingly engaged with the frame for movement along a length thereof.

DETAILED DESCRIPTION OF THE INVENTION

Figure 1:
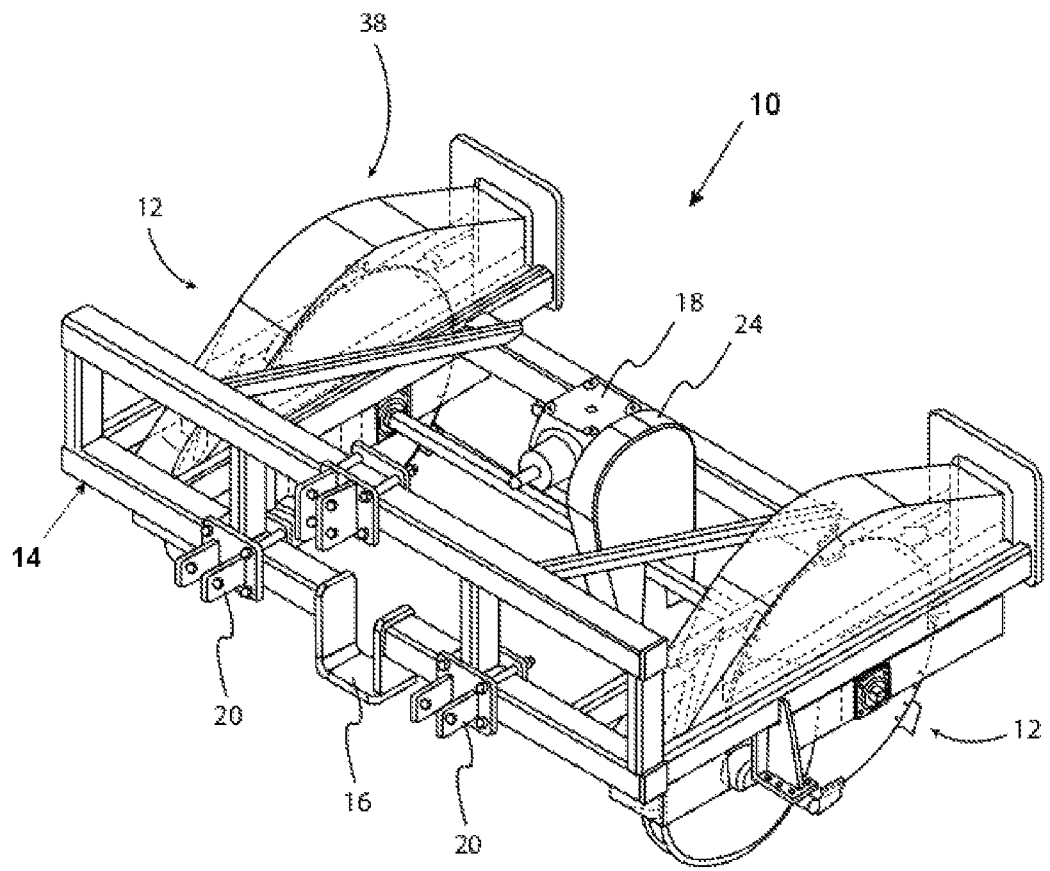
FIG. 1 shows a perspective view of an embodiment of a device having two cutting assemblies according to the present invention.

The exemplary devices illustrated herein use a common cutting mechanism, aspects of which are shown across the various drawings. A cutting assembly 38 includes, generally, a pair of containment coulters 34 positioned in side-by-side alignment and defining a space therebetween. A rotary cutter 28 is positioned rearward of containment coulters 34, and a portion of rotary cutter 28 extends into the space between the first and second containment coulters 34 that make up the pair. A shroud 36 has a top that extends over at least a portion of the pair of containment coulters 34 and rotary cutter 28, and further includes sidewalls extending downward from the top along at least a portion of the height of containment coulters 34 and rotary cutter 28. Rotary cutter 28 includes a plurality of trencher teeth 30 along a peripheral edge thereof.

The description provided below provides, in reference to the various drawings, two illustrative devices having cutting mechanisms according to the teachings of the present invention. It is to be understood that the descriptions below, and the corresponding drawings, are illustrative, and that the principles of the present invention may be applied to devices other than those described here.

Example 1

Mulching Machine for Strawberry Mother Plant Removal

Figure 9:
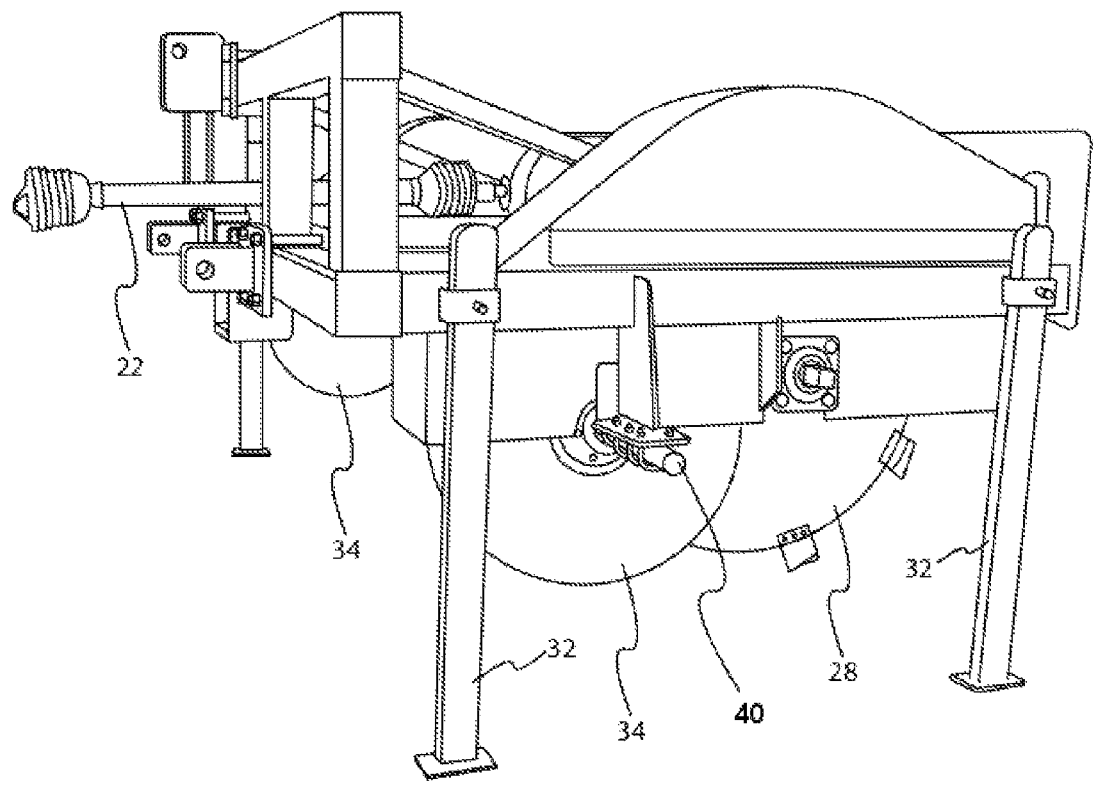
FIG. 9 is a side view of a device with removable legs having two cutter heads according to the present invention.

FIG. 1 shows an embodiment of a mulching machine 10 with two cutting heads 12. The components of the mulching machine are mounted on a frame 14, which may be assembled from various sections of structural steel arranged to have a front, back, and sides. Frame 14 further includes connectors 20 for attaching mulching machine 10 to a tractor. As best illustrated in FIG. 9, described below, frame 14 is configured to allow the attachment through guide 16 of a power take-off shaft 22 from a tractor or other vehicle, which can be utilized to provide rotational motion to gearbox 18. Gearbox 18 operates a chain drive 24 that drives shaft 26, which is attached to the rotary cutter 28 of each cutting head 12. Rotary cutter 28 includes a plurality of trencher teeth 30, where each tooth typically has a profile and shape that promote the scooping, carrying, and depositing of soil and plant material. It is contemplated that the embodiment of the mulching machine 10 shown in FIG. 1 has a maximum tip speed of about 2500 ft/min.

Figure 2:
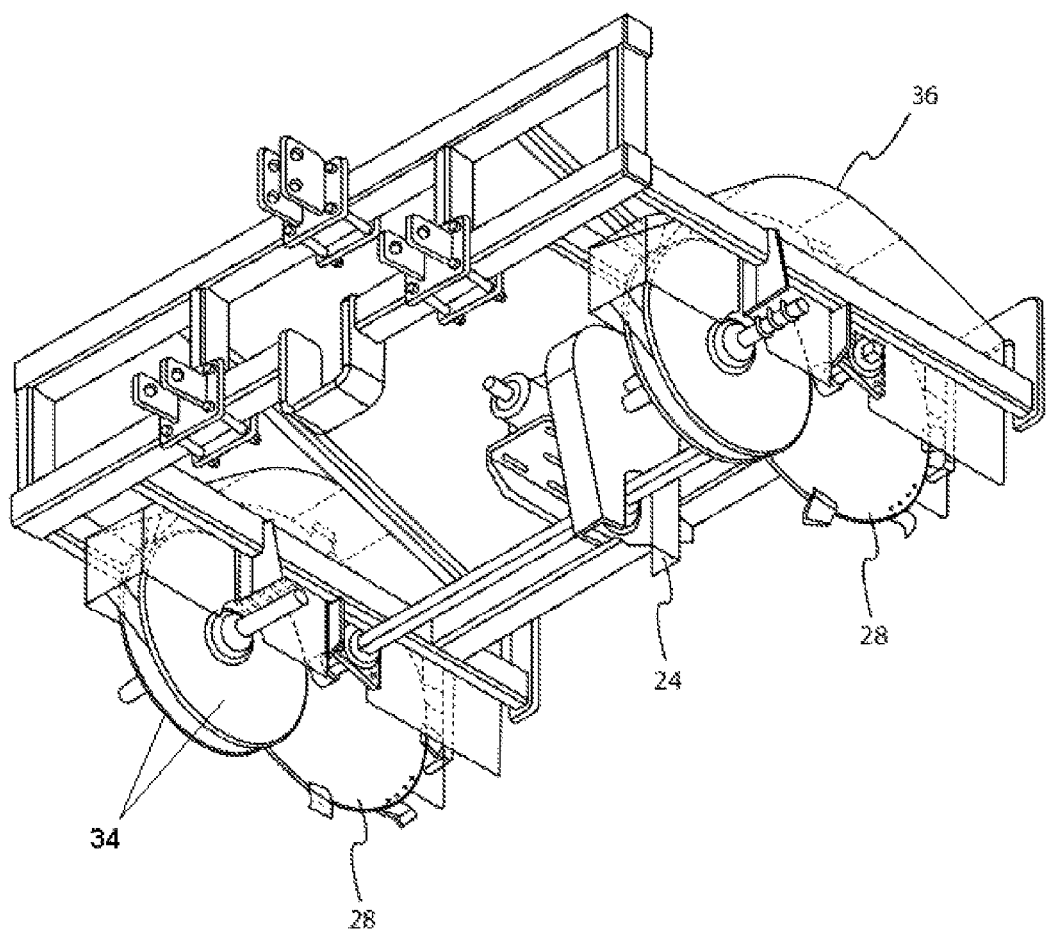
FIG. 2 is a second perspective view of the device of FIG. 1.

FIG. 2 provides a bottom perspective view of the device shown in FIG. 1. Shown from the bottom, the illustration provides additional detail about the cutting mechanism of the device, including the spatial relation between rotary cutter 28 of each cutting head, and the pair of containment coulters 34 of each cutting head. Also shown is a shroud 36 extending over the top of each rotary cutter 28 and pair of containment coulters 34. Chain drive 24 is also more readily seen from this angle.

Figure 3:
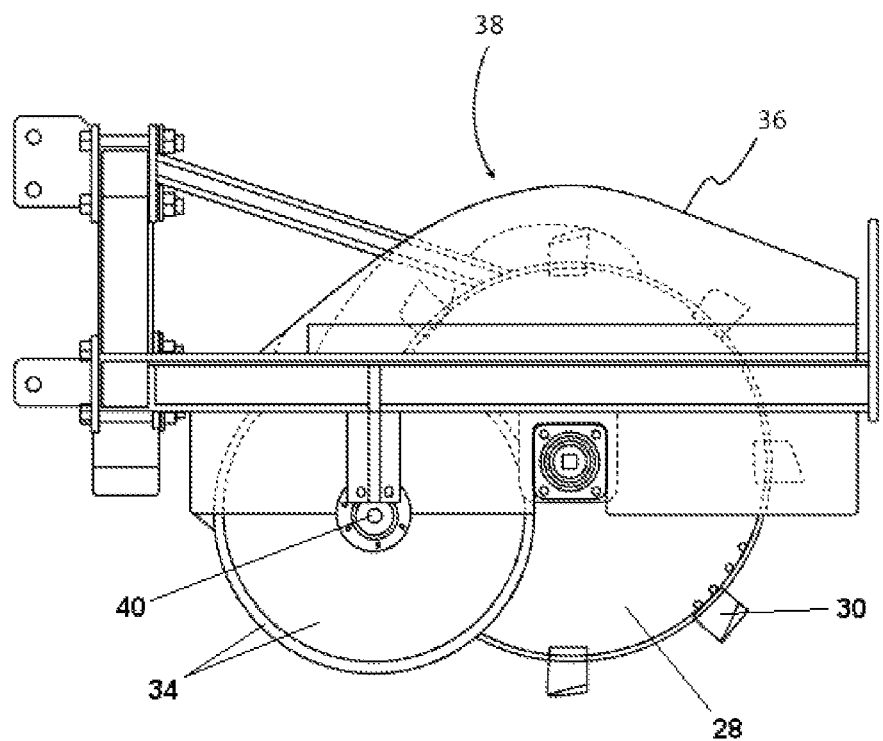
FIG. 3 is a side view of a device having a cutting assembly according to the present invention.

FIG. 3 provides a side view of a cutting assembly 38, and shows additional features in the relationship between rotary cutter 28 and containment coulters 34. In the embodiment of cutting assembly 38 shown in the figure, cutting assembly 38 is configured to excavate to a depth of approximately six inches. Maintenance of that excavation depth is accomplished by the pair of containment coulters 34 mounted on stationary shaft 40. By way of example, rotary cutter 28 may have a diameter of thirty-six inches, whereas containment coulters 34 have a diameter of twenty-four inches. This difference in diameters, and the vertical offset between rotary cutter 28 and containment coulters 34, allows the excavation depth to be configured.

Figure 4:
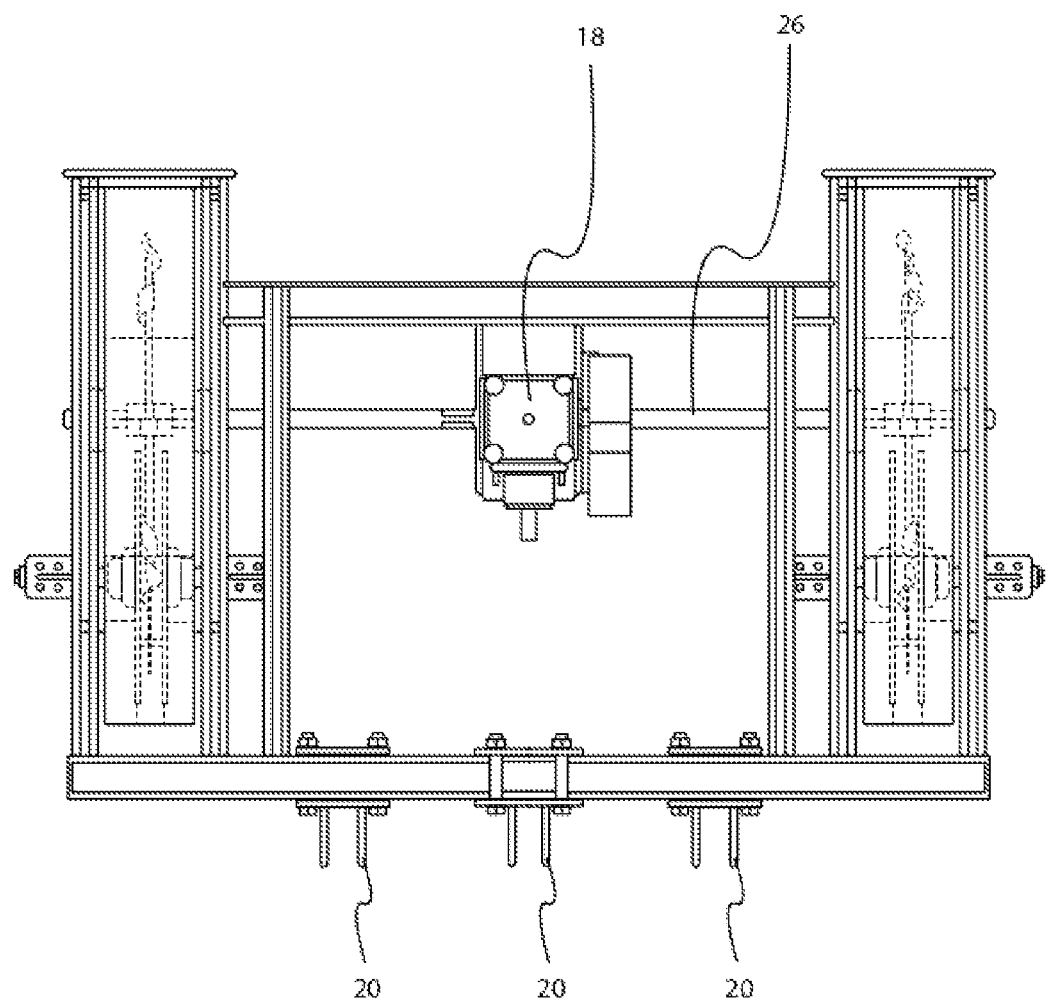
FIG. 4 is a top view of the device of FIG. 1.
Figure 5:
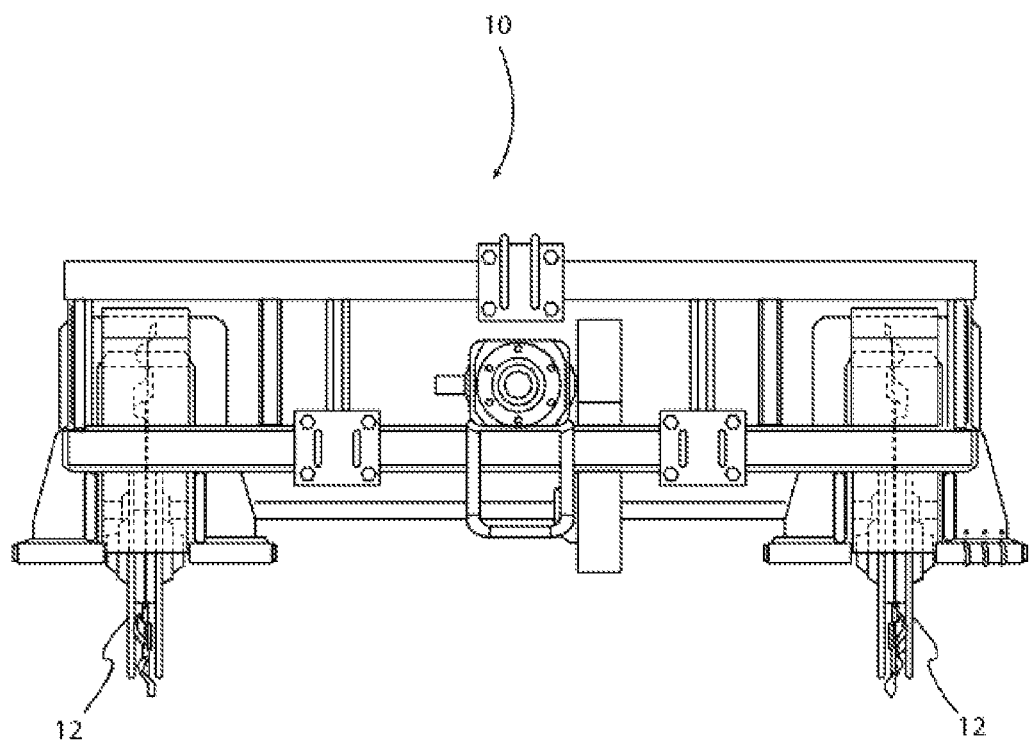
FIG. 5 is a front view of the device of FIG. 1.

FIGS. 4 and 5 provide top and front views, respectively, of mulching machine 10. Various components shown from these angles are described above.

Figure 6:
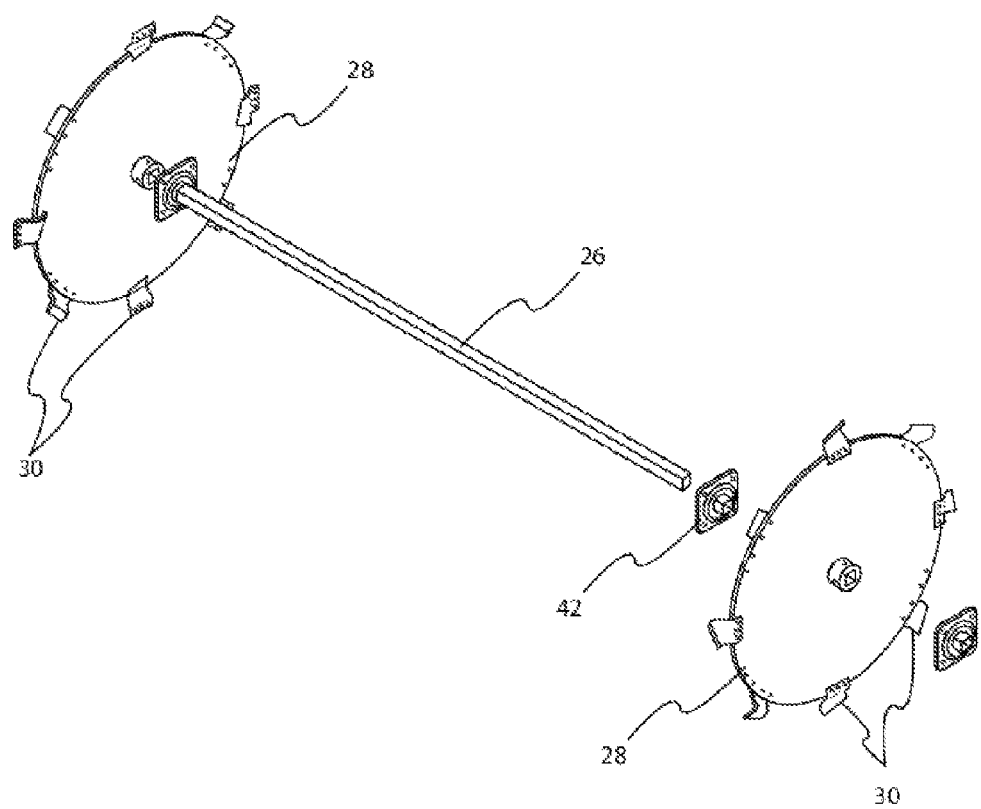
FIG. 6 is a perspective view of an embodiment of a rotary cutting assembly of a device having two cutter heads according to the present invention.
Figure 7:
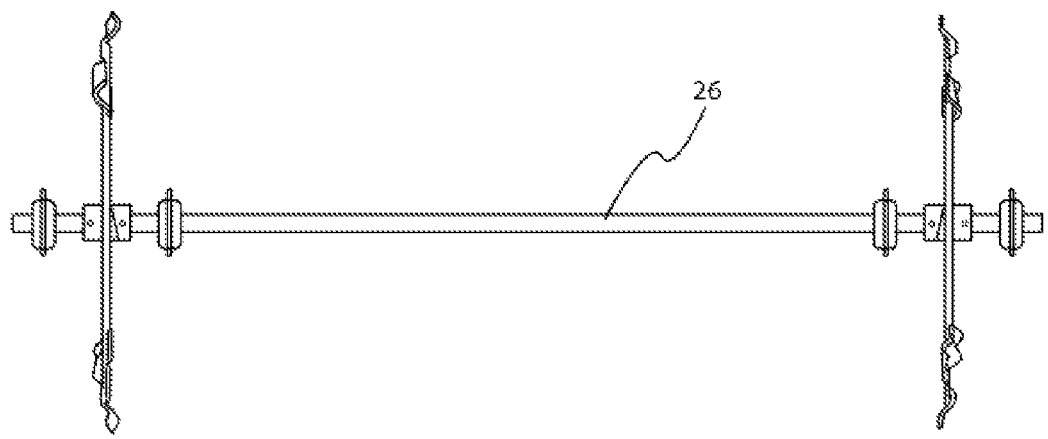
FIG. 7 is a front view of the rotary cutting assembly of FIG. 6.

FIG. 6 provides a perspective view of a rotary cutting assembly of mulching machine 10, which has two cutter heads as described above. A shaft 26 extends between rotary cutters 28, with square bore bearings 42 accepting shaft 26 as well. Square bore bearings 42 include, in the embodiment shown, a four-bolt flange that allow square bore bearings 42 to be affixed to the shroud, frame, or other portion of mulching machine 10, while still allowing rotation of shaft 26. FIG. 7 depicts the rotary cutting assembly of FIG. 6, with the components thereof assembled.

Figure 8:
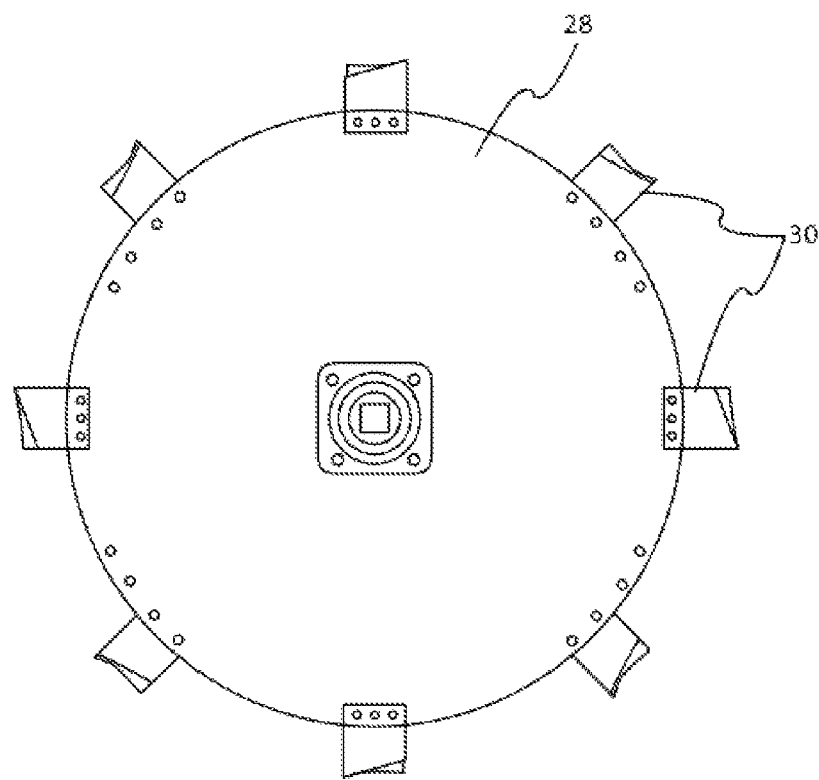
FIG. 8 is a side view of a rotary cutter of the present invention.

FIG. 8 is a side view of an exemplary rotary cutter 28 for use with mulching machine 10. Rotary cutter 28 has a plurality of trencher teeth 30 disposed around the periphery thereof. The various functions of trencher teeth 30 provided along the periphery of rotary cutter 28 are described more fully below.

FIG. 9 shows an embodiment of mulching machine 10 supported by detachable legs 32. A power take-off shaft 22 is also depicted, the power take-off shaft being connected to a tractor or other vehicle. Containment coulters 34 are visible, as is a rotary cutter 28 disposed between a pair of containment coulters 34. Containment coulters 34 may be mounted on a stationary shaft 40. In the embodiment shown, containment coulters 34 are spaced approximately 2.5 inches apart, but the spacing may be adjusted accorded to the anticipated size of any given mother plants to be removed by mulching machine 10.

Figure 10:
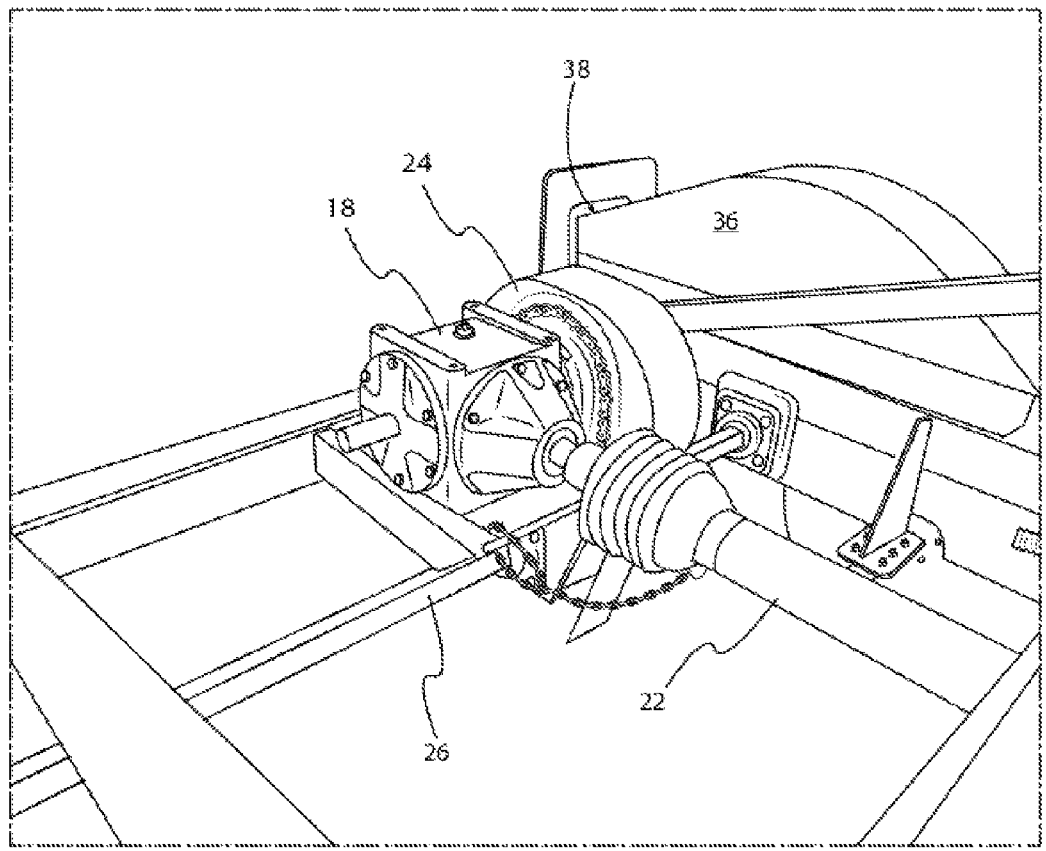
FIG. 10 depicts a drive line and gear box used in one embodiment of the device of FIG. 1.

FIG. 10 provides a close view of an embodiment of gearbox 18, which operates chain drive 24, which in turn rotates shaft 26. Power take-off shaft 22 is shown engaging gear box 18 Cutting heads 12 are contained within cutter shroud 36 which, together with containment coulters 34 and the associated shaft, bearings, and other hardware, comprise cutting assemblies 38. While mulching machine 10 is shown in the figures as having two cutting assemblies 38, it is contemplated that a device may include only one cutting assembly 38, or may include more than two cutting assemblies 38 mounted on a wider frame 14. Shaft 26 may be assembled with flexible joints, thereby allowing floating of each cutting head as required by the ground surface. The spacing of the cutting assemblies 38 may also be made adjustable with respect to the respective position of each cutting assembly on frame 14, and by utilizing a telescoping/contracting shaft 26.

Figure 11:
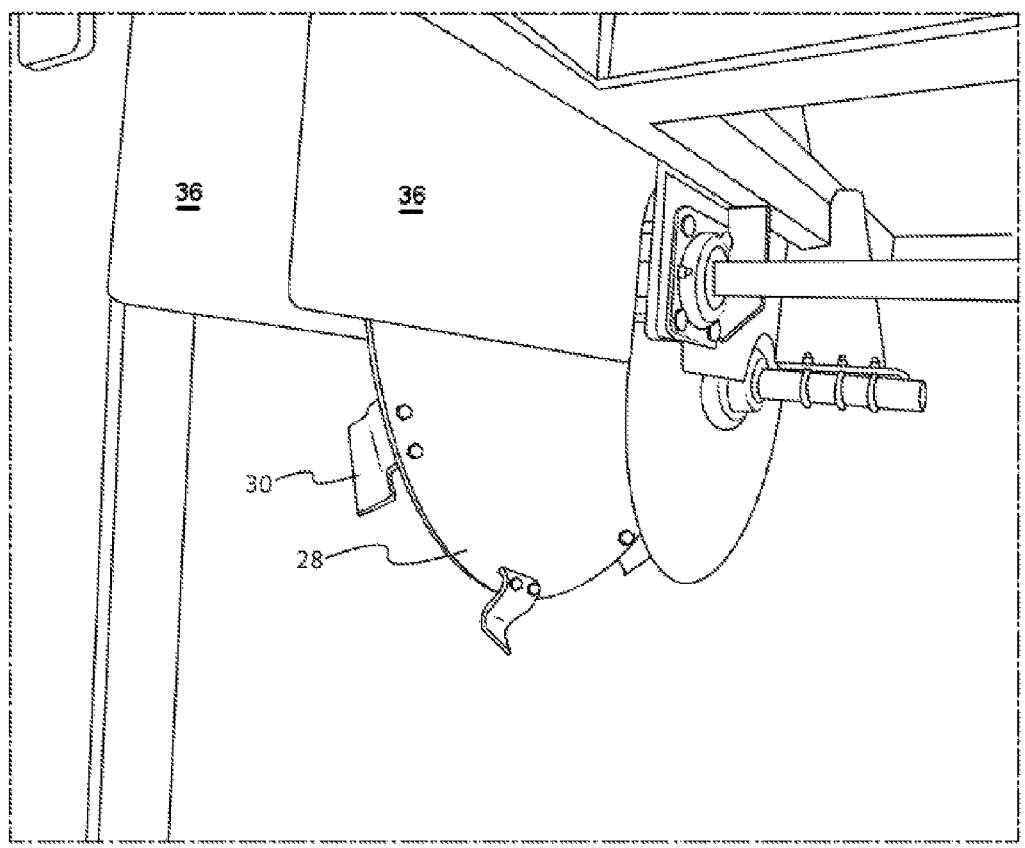
FIG. 11 depicts a rotary cutter inside of a containment shroud and shows how the square shaft penetrates the shroud to engage the rotary cutter.
Figure 12:
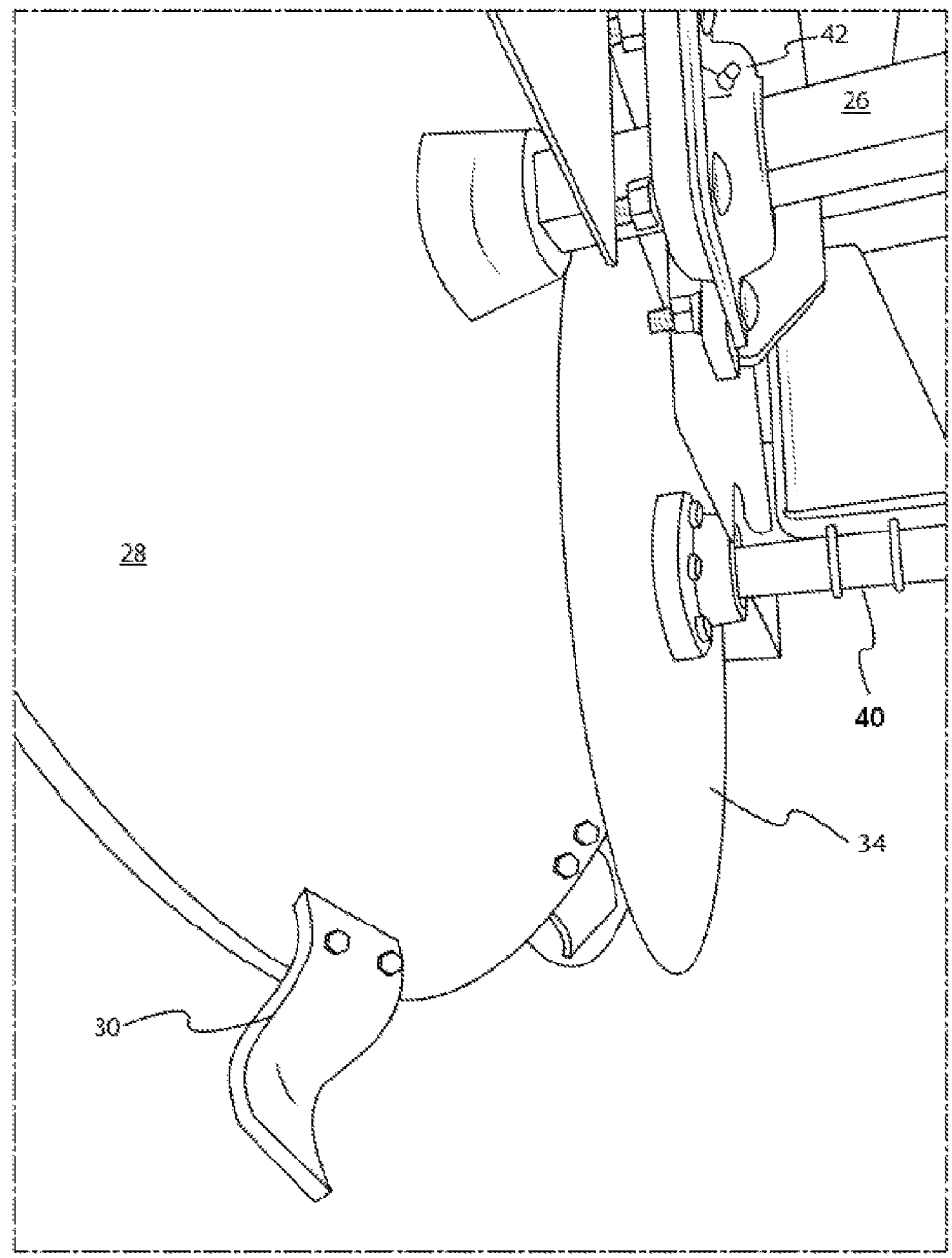
FIG. 12 is a second view of the rotary cutter of FIG. 11.
Figure 13:
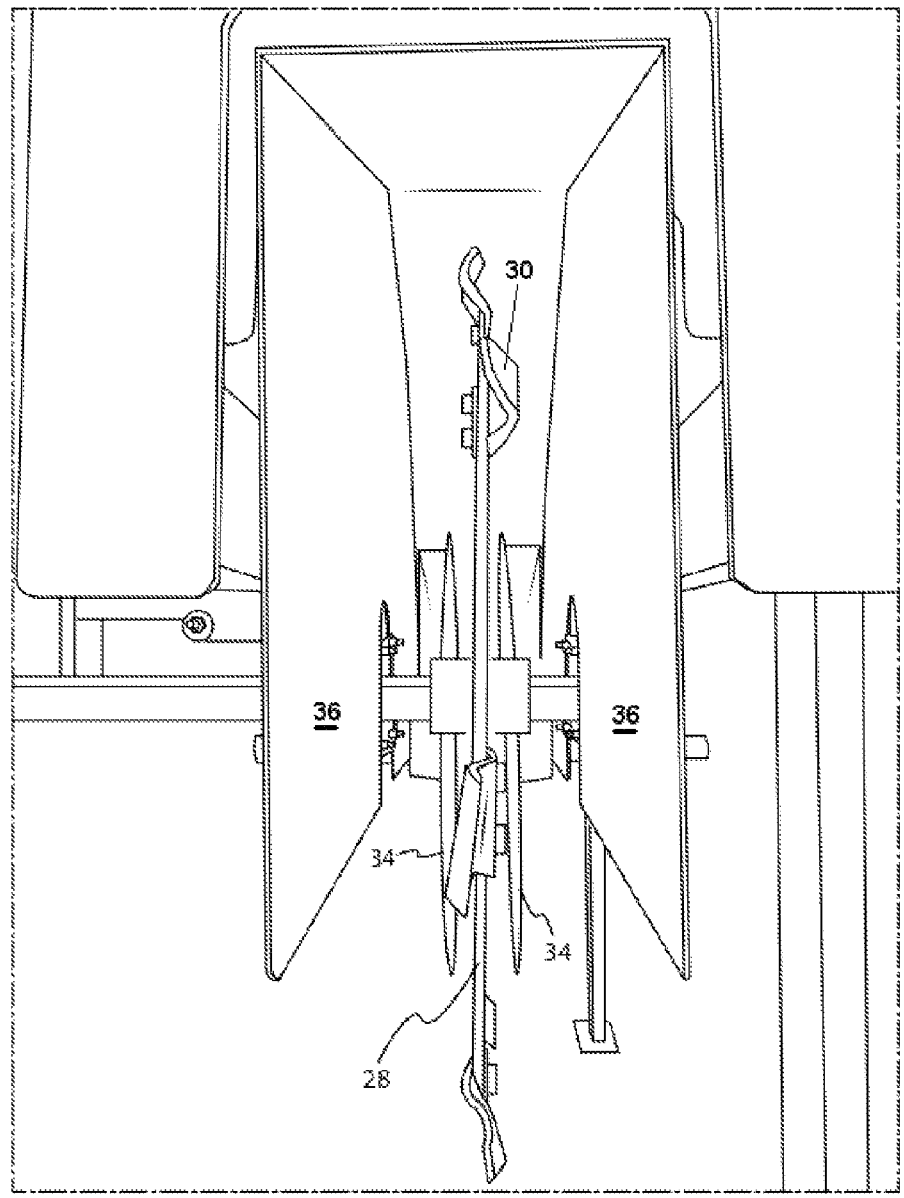
FIG. 13 is a rear view of a rotary cutter within a shroud, with the containment coulters positioned to the front of the rotary cutter. For purposes of illustration, the shroud is depicted without internal guides.
Figure 14:
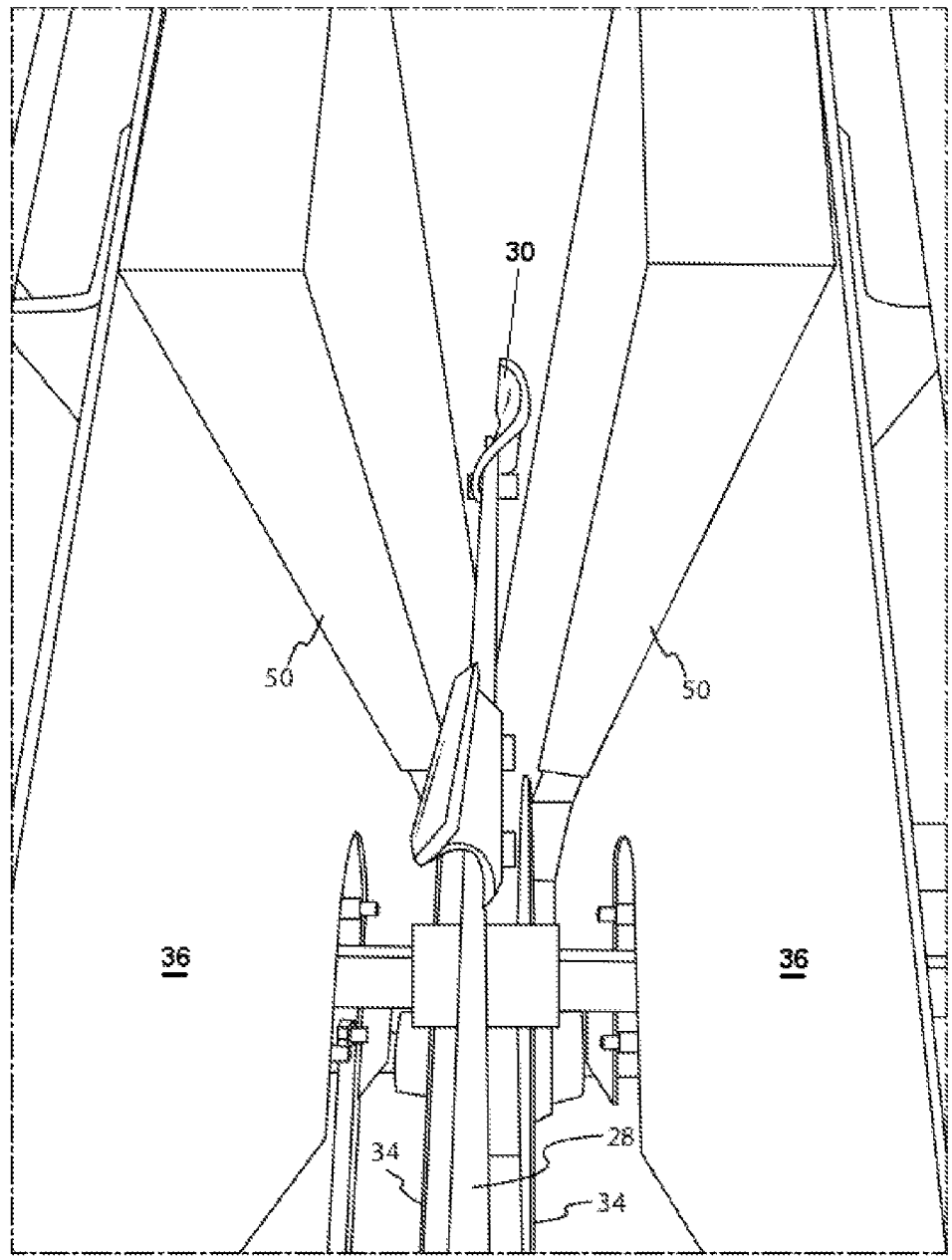
FIG. 14 is a rear view of a rotary cutter within a shroud. In this illustration, the shroud has internal guides located to the outside of the containment coulters.

FIGS. 11 and 12 show close view of components of cutting assembly 38, with FIG. 11 depicting portions of shroud 36 while FIG. 12 is a view close enough that the portions of shroud 36 are not visible. Containment coulters 34 are disposed on either side of rotary cutter 28. Rotary cutter 28 is attached to shaft 26, which penetrates shroud 36 through a square bore bearing 42. Stationary shaft 40, on which containment coulters 34 are mounted, is also shown FIG. 13 shows a shroud 36 around rotary cutter 28, which has no internal guides or other structure for directing the flow of plant material or soil. This embodiment is contrasted with that shown in FIG. 14, which shows rotary cutter 28 housed on is upper side by internal guides 50. Both FIGS. 13 and 14 depict trencher teeth 30 along the periphery of rotary cutter 28.

Operation of mulching machine 10, and the associated cutting assemblies 38, is now described, with reference to the figures described above. The description provided is with respect to strawberry mother plant removal, though the device may be used for other purposes. Mulching machine 10 digs a trench along a plant bed, separates heavy soil from lighter plant material, and buries extracted and pulverized plant material into the trench behind the machine. Using as a reference the view shown in FIG. 9, containment coulters 34 cut runners from the strawberry mother plants. Rotary cutter 28 spins in a clockwise direction within shroud 36, such that trencher teeth 30 remove and pulverize the mother plant and also scoop soil into the forward end of shroud 36. The interior walls of containment coulters 34 ensure that the material is directed upwardly into the shroud. Internal guides 50 funnel the pulverized plant material rearwardly for discharge through the rear of shroud 36. The interaction of the clockwise rotating rotary cutter 28 and trencher teeth 30 with internal guides 50 has been surprisingly found to cause the heavier, fresh dirt to be thrown to the top of shroud 36, while the lighter plant debris is transported by trencher teeth 30. As a result, there is separation of soil and plant debris occurring within shroud 36 such that the first material to be deposited into the trench behind the device is the plant material, followed by a deposit of soil over the plant material. The complete destruction of the mother plant, as well as the insertion of the plant material into the trench, where it is covered with soil, ensures that the mother plant does not re-root.

As shown, for example, in FIG. 7, the teeth 30 of the rotary cutter 28 are configured in both a right-hand and left-hand configuration. Without the internal guides 50, the spray of soil and pulverized plant material from shroud 36 is wide and mixed. With internal guides 50 in place, however, and in combination with trencher teeth 30 as shown in the drawings and the relatively slow tip speed provided by the chain drive shaft, the soil and pulverized plant material are discharged in a narrow stream into the trench, with pulverized plant material filling the bottom of the trench and relatively clean soil filling in the top of the trench.

Example 2

Crown Remover and Mulcher

Figure 15:
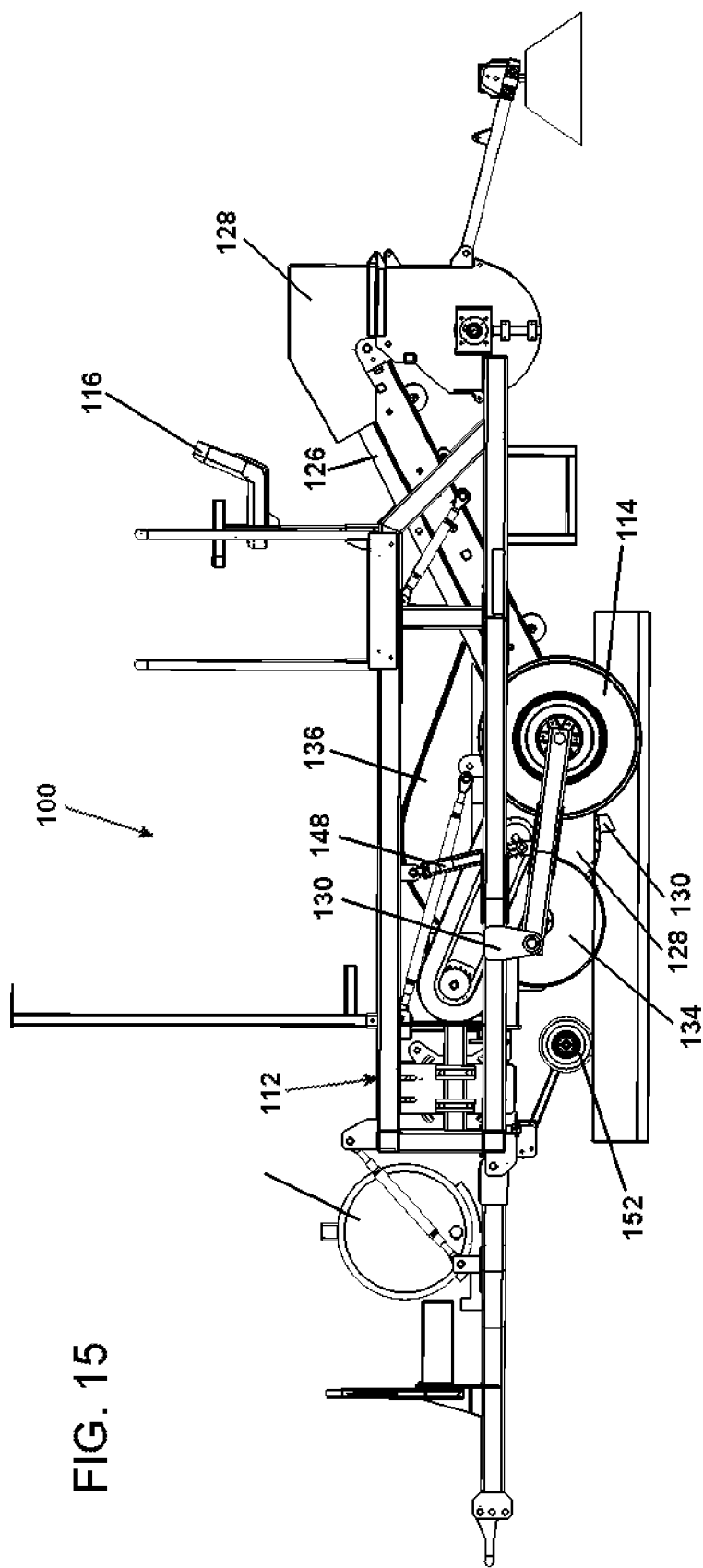
FIG. 15 is a side view of a crown cutting device utilizing cutting mechanisms in accordance with the teachings of the present invention.

FIG. 15 is a side view of an exemplary crown remover and mulcher 100 (hereinafter referred to crown remover 100) having a cutting mechanism according to the teachings of the present invention. Crown remover 100 includes generally a frame 112, gauge wheels 114, a seat 116, hydraulic oil tank 120, conveyor 126, and grinder 128. As with the mulching machine 10 described above, crown remover 10 includes at least one cutting assembly having a rotary cutter 128, a pair of containment coulters 134, and a shroud 136.

Frame 112 is preferably constructed of steel and provides a support on which the various other components of crown remover 100 are mounted. It should be noted that the design or configuration of frame 112 shown in the figures is exemplary, and that various modifications to the size, shape, or configuration of frame 112 may be made without departing from the scope of the present invention.

Gauge wheels 114 are preferably pneumatic tires rotatably mounted to frame 112 and disposed on either side thereof. Gauge wheels 114 allow crown remover 100 to travel along a plant row or bed, and also serve to set the overall ride height of crown remover 100. Further, gauge wheels 114 are preferably used to lift crown remover 100 into transport position when it is necessary to transport the device to a job site or to move the device from one job site to another. The overall height of crown remover 100 with respect to the ground is adjusted hydraulically, with pivot 130 serving as the point of adjustment to raise or lower frame 112. As frame 112 is raised or lowered, the various components of the present device attached to frame 112 are also raised or lowered.

The hydraulic or other controls of the present invention are utilized by an operator, who may be seated in seat 116 as crown remover 100 is in use. Operator controls (not shown) are preferably provided at or near seat 116 so that an operator seated in seat 116 can access them easily. The operator controls can provide any desired functionality, including, but not limited to, controlling the speed of crown remover 100, adjusting the height of the device, lateral adjustment of crown remover 100, and engaging the conveyor, grinder, draper wheel, brush, and the like.

Various other aspects of crown remover 100 may also be controlled hydraulically. These aspects may include the overall ride height of the device, as well as the lateral adjustment of the device. A hydraulic oil tank 120 is preferably provided, secured to frame 112, to provide a reserve supply of hydraulic oil for use with crown remover 100.

Figure 16:
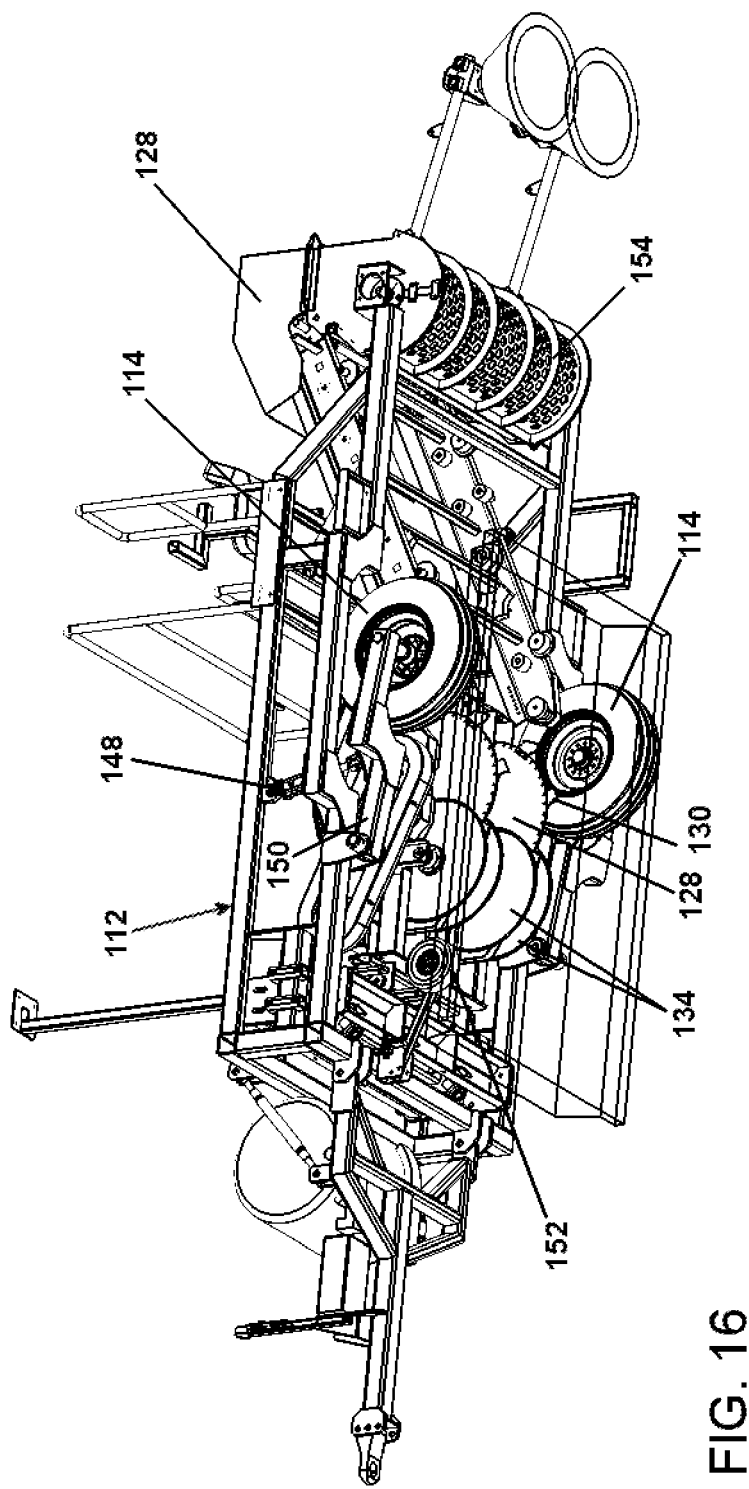
FIG. 16 is a bottom perspective view of the device of FIG. 15.

FIG. 16 shows a bottom perspective view of the embodiment of a crown remover 100 shown in FIG. 15. From the bottom view, details of the cutting assemblies can be seen, and the various components of the cutting assemblies operate substantially as described with respect to mulching machine 100, above.

The construction of crown remover 100 allows the device to cut as narrowly as desired and, consequently, to cut the crown from the surrounding feeder root material while removing as little of the feeder root material as possible. Containment coulters 134 make the cuts that separate the crown from the feeder root material and adjacent canes, and rotary cutter 128 removes and pulverizes the crown material. The crown material moves upwardly into shroud 136 and is directed to conveyor 126. Smaller portions of the crown material may fall through conveyor 126 back to the ground, while larger portions are directed by conveyor 126 to grinder 128, where they are ground into smaller portions and deposited back onto the ground. Some embodiments of the crown remover 100 may not include conveyor and grinder 128, and it is to be noted that the degree to which plant material such as crowns (or mother plants in the case of strawberries) are shredded or otherwise pulverized can be adjusted by adjusting the speed of rotary wheel 128 and/or the style and spacing of trencher teeth 130. Crown remover 100 is adapted to a variety of ground conditions, including rocky ground, and achieves a level of crown removal and preservation of feeder roots that is comparable to that of manual secondary processes used in the past.

Figure 17:
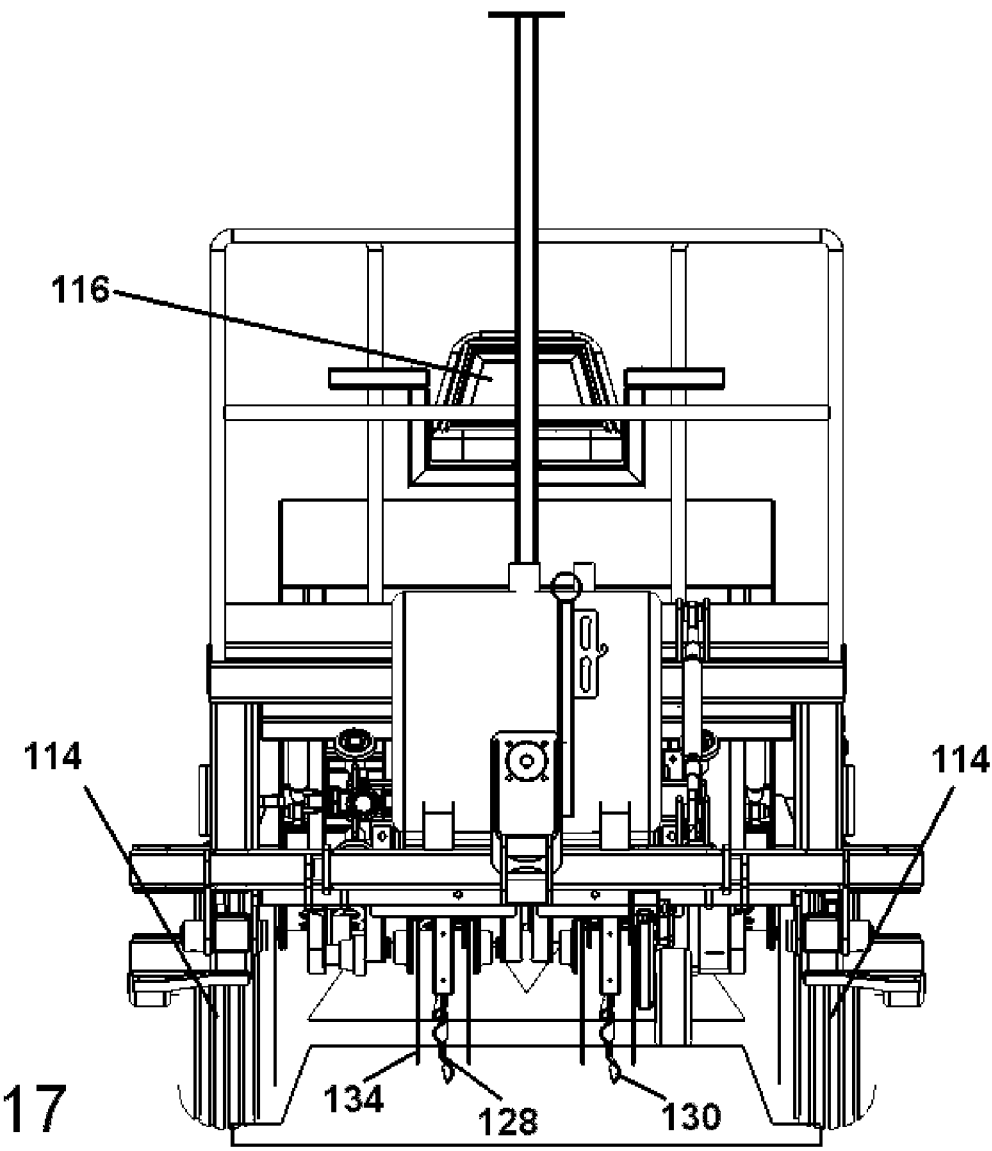
FIG. 17 is a front view of the device of FIG. 15.

Crown remover 100 preferably includes two gauge wheels 114, as best seen in FIGS. 16 and 17. One gauge wheel assembly is located on the left side of crown remover 100, the other similarly-positioned on the right side of the device. Hydraulic cylinders 148, one on the left side of crown remover 100 and a corresponding hydraulic cylinder on the opposite side of crown remover 100 (not shown) are attached at one end to gauge wheel arms 150, and at the other end to frame 112. The hydraulic cylinders allow frame 112 to move up and down with respect to gauge wheels 114. It is contemplated that float cylinders 148 may be locked with respect to one another, such that they raise and lower the height of frame 112 as one. Alternatively, hydraulic cylinders 148 may be adjusted independently of one another, such that one side of crown remover 110 is raised to a greater or lesser degree than the other. The amount of variation in the two sides of the device may depend on such factors as the shape or slope of a plant bed, and the like. Rotary cutter 128 preferably rotates clockwise, from the perspective of crown remover 100 shown in FIG. 16, and the speed of rotation may be adjusted by the operator.

Also best shown in FIGS. 15 and 16 is a ground following wheel 152, which is provided ahead of cutting assembly 122 with respect to the direction of travel of crown remover 100. Ground following wheel 152 is preferably connected to a sensor that controls a hydraulic valve that actuates a hydraulic cylinder which adjusts the height of frame 112 with respect to ground following wheel 152. Thus, the depth of the cutting mechanisms of the device is determined. The fixed relationship between ground following wheel 152 and frame 112 in any given instance ensures that the cutting mechanisms of the device remain at the proper depth within the plant bed. As the height of the plant bed varies, rising or falling as crown remover 100 moves along its length, ground following wheel 152 moves up and down in conformity with the upper surface of the plant bed. As ground following wheel 152 moves up and down, cutting assemblies 122 are raised and lowered within the soil to the same degree.

The bottom view in FIG. 16 also provides a view of conveyor 126, which carries plant material in an upward direction and deposits it into grinder 128. Once in grinder 128, the material is processed into small, non-harvestable particles. These particles exit grinder 128 through sizing screen 154, then fall to the ground. Sizing screen 154 preferably includes a perforated surface having a plurality of openings through which the particles fall. By varying the size of the openings in cylinder wall exit 142, the operator of crown remover 100 can control the size of the particles that leave grinder 128 and fall to the ground.

When non-harvestable particles fall from grinder 128, they fall onto the plant bed. The presence of debris on the plant bed can interfere with the proper operation of other devices that may travel along the plant bed after the device of the present invention. Thus, in some embodiments of the present invention, one or more brushes are provided to sweep the debris from the plant bed and into the furrow running alongside the plant bed. Any suitable brushes may be used. In some embodiments of crown remover 100, for example, rotary brushes may be used to sweep aside the non-harvestable particles and debris on the plant bed.

FIG. 17 provides a front view of one embodiment of a crown remover 100 having cutting mechanisms according to the present invention. Gauge wheels 114 are clearly visible, as are the containment coulters 134 and rotary cutter 128 of cutting assemblies 122. Trencher teeth 130 of rotary cutter 128 can also be seen.

Figure 18:
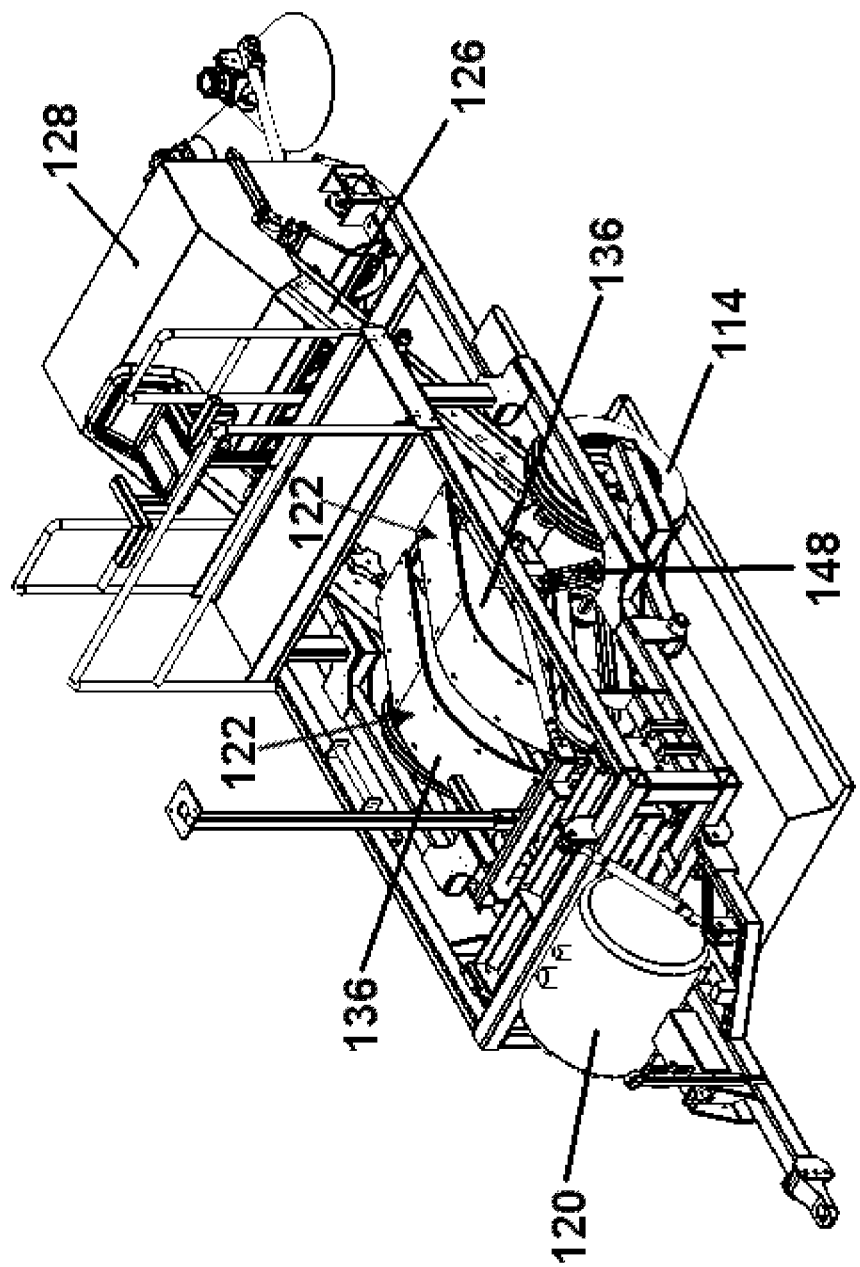
FIG. 18 is a top perspective view of the device of FIG. 15.

FIG. 18 is a top perspective view of crown remover 100. Cutting assemblies 122 are visible, as are shrouds 136 of each assembly. Conveyor 126 and grinder 128 are also visible from this angle, as is one of gauge wheels 114 and one of hydraulic cylinders 148.

In operation, crown remover 100 is controlled by an operator who drives the device along the length of a plant bed. The operator can adjust the height of the cutting mechanism by adjusting the ride height of the frame and associated components. In some embodiments, the ride height may be different on each side of the vehicle, to account for a slope or angle in the plant bed. As the operator positions the vehicle along the plant bed, containment coulters 134 may cut plant material at an appropriate depth preselected by the operator. Rotary cutter 128 lifts plant material, such as plant crowns, with teeth 130 in particular lifting the plant material free of the plant bed. Treatment of the soil and plant material within shrouds 136 is as described with respect to mulching machine 10, above, however instead of being deposited back to the ground the plant material is deposited onto conveyor 126, whereupon it travels along conveyor 126 and is delivered into grinder 128. Soil and small particles pass through the conveyor belt of conveyor 126. The conveyor belt used with conveyor 126 may be a belted chain made from a plurality of round bars with spacing between bars. The plant material is processed into non-harvestable particles within grinder 128, and those particles fall through sizing screen 154 and onto the ground, where they can be brushed away in preparation for harvesting of raspberry roots or other plant material. Crown remover 100 may be associated with another vehicle for the purpose of moving crown remover 100 along the length of a plant bed. Crown remover 100 may also be self-propelled, and in such cases the operator of crown remover 100 may also control the speed of the device.

The depth of containment coulters 134 and rotary cutter 128 may be varied according to the needs of the operator. This may depend on a variety of factors, including the type of plant in the plant bed. For example, with respect to raspberries, the height may be set to maximize the amount of plant root left in the ground. In the case of strawberries, however, the goal is to destroy mother plants as completely as possible, and the depth is set with this goal in mind.

Example 3

Additional Embodiment of Mulching Machine for Strawberry Mother Plant Removal

Figure 19:
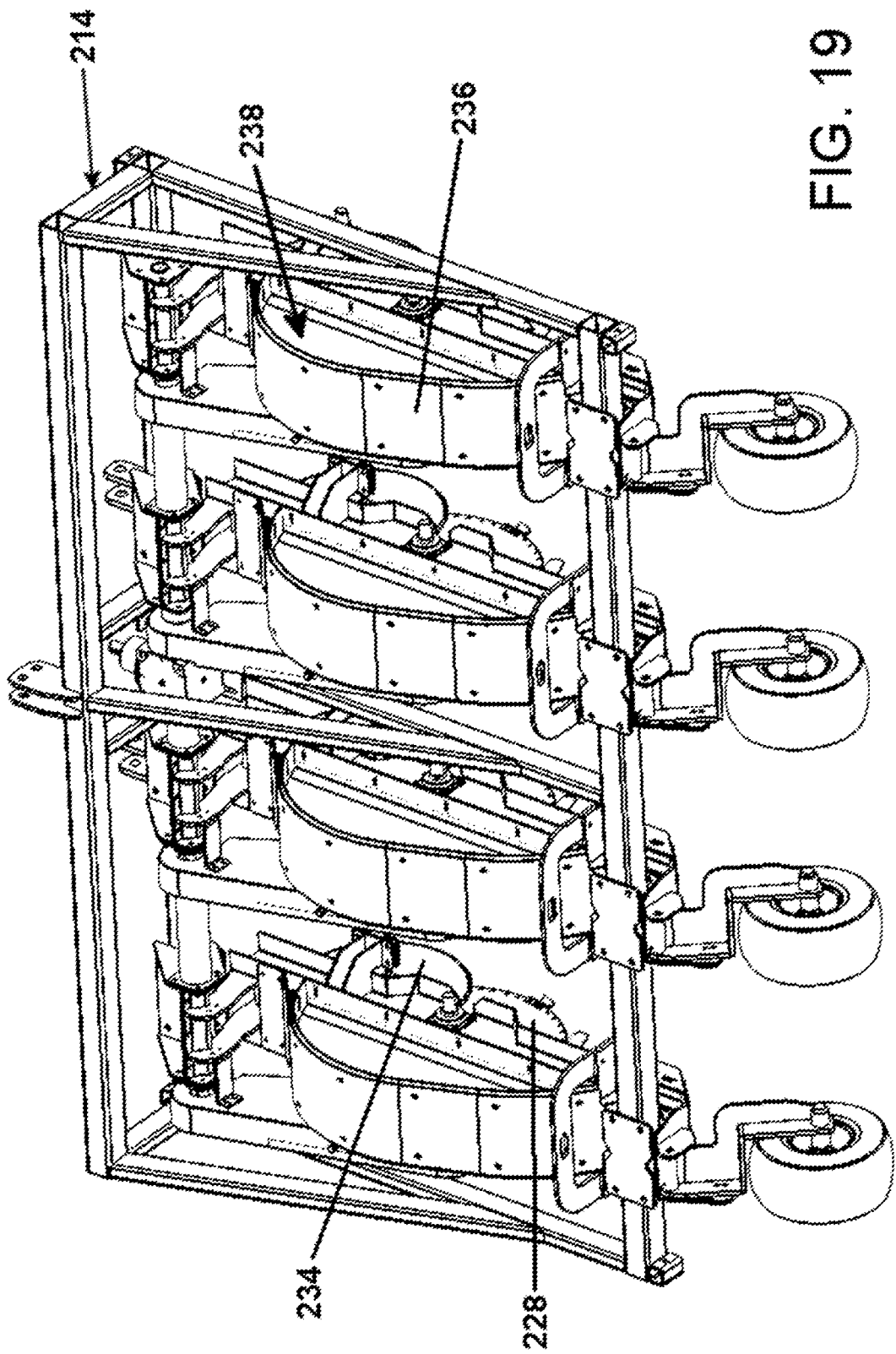
FIG. 19 is a perspective view of a device having four cutting assemblies according to the present invention.

FIG. 19 provides a perspective view of an additional embodiment of a device for strawberry mother plant remove incorporating cutting mechanisms according to the present invention. As can be seen in the drawing, mulching machine 200 includes four cutting assemblies 238 arranged in side-by-side position. Cutting assemblies 238 share the same core components of the cutting assemblies described with respect to Examples 1 and 2, above, however additional structure or changes in structure are also provided. It is contemplated that the spacing between the cutting assemblies can be varied by sliding one or more of the cutting assemblies along frame 214.

Figure 20:
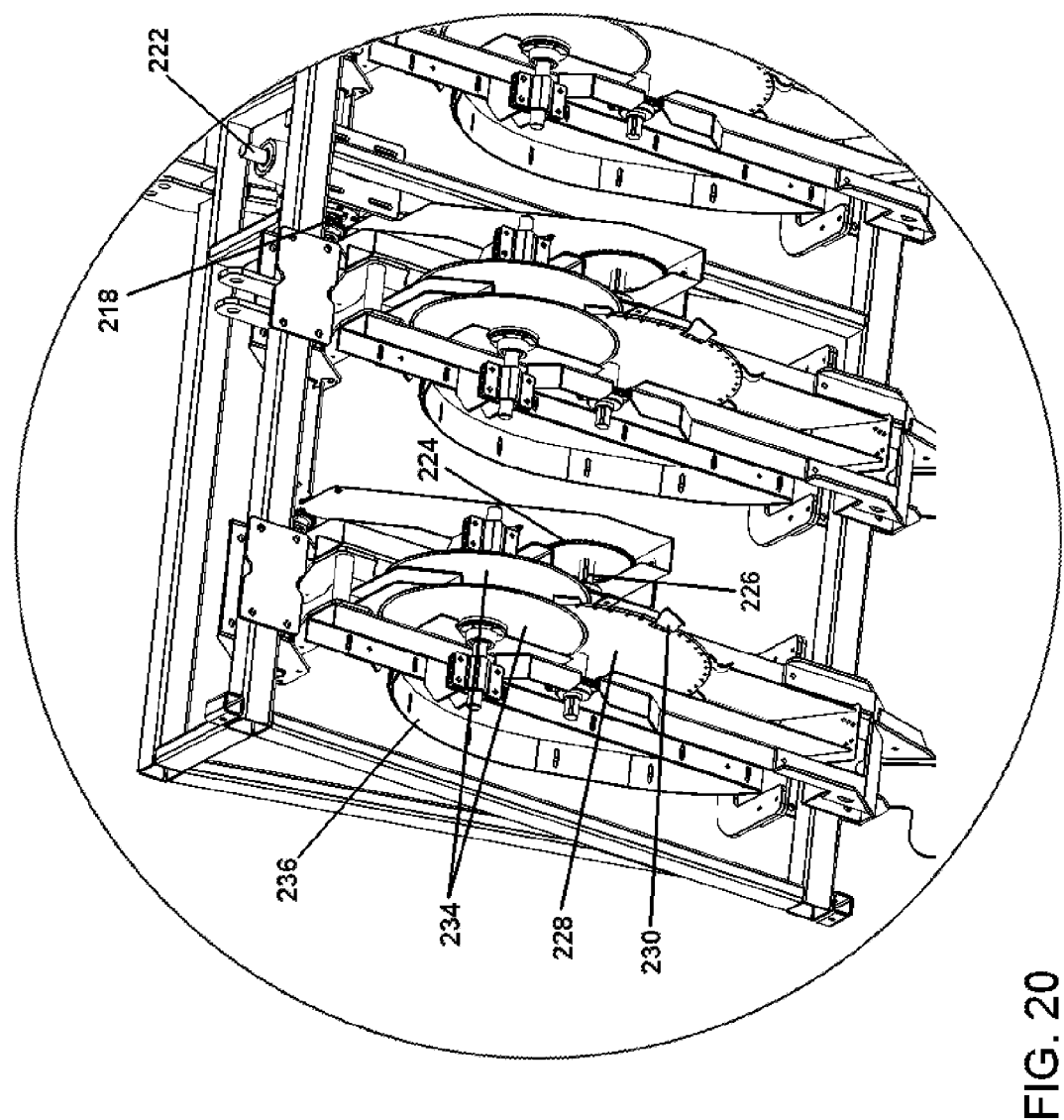
FIG. 20 is a close bottom perspective view of an embodiment of a cutting assembly according to the present invention.

A single containment coulter 234 of each cutting assembly 238 is visible in FIG. 19, as are rotary cutters 228 for all but the right-most cutting assembly. FIG. 20, which provides a bottom perspective view of the device of FIG. 19, depicts both containment coulters 234, rotary cutter 228, and trencher teeth 230. As with other embodiments of the present device, the components recited above are at least partially contained within a shroud 236. As can be seen clearly in FIG. 20, each cutting assembly 238 includes a dedicated chain drive 224 that engages a shaft 226 that extends through rotary cutter 228. Power take-off shaft 222 is adapted to engage a vehicle power take-off, and in turns engages gear box 218. The left portion of gear box 218 preferably feeds the two chain drives 224 on the left half of the device, whereas the right portion of gear box 218 preferably feeds the two chain drives 224 on the right half of the device. The cutting assemblies may be fed by a common drive shaft.

It is contemplated that each chain drive 224 has a torque-limiting clutch associated therewith so that the drive mechanism may be disengaged when necessary to prevent damage to mulching machine 200. In addition, each cutting assembly 238 is pivotable around a pivot, so that when a cutting assembly 238 meets an obstruction, such as a rock, the cutting assembly 238 can pivot over the rock without damaging mulching machine 200 or dragging the rock along with mulching machine 200. Cutting assemblies 238 sit on a stop at the rear end of the device and are not fixedly attached to frame 214, thereby allowing cutting assemblies 238 the freedom to pivot when necessary. As shown in FIG. 19, each cutting assembly 238 has its own gauge wheel, which remains fixed even if the cutting assembly 238 pivots as described below. The use of the gauge wheel maintains the tip of rotary cutter 228 at a desired depth.

Figure 21:
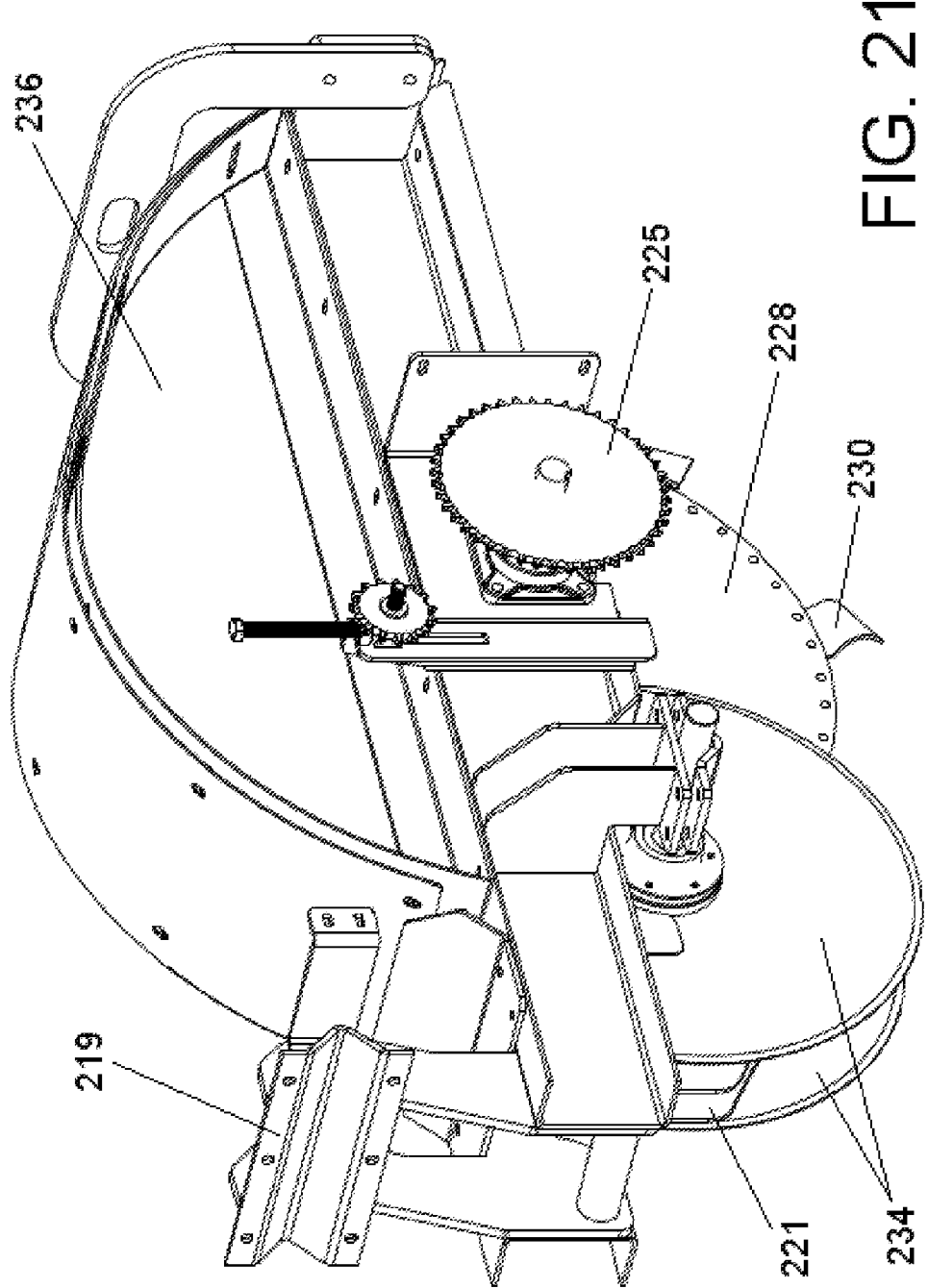
FIG. 21 is a perspective view of an embodiment of a cutting assembly according to the present invention.

FIG. 21 depicts an embodiment of a cutting assembly according to the present invention, the cutting assembly shown independently of any associated structure. Shroud 236 is shown, and it should be understood that the width of shroud 236 can be adjusted (e.g. widened or narrowed) by adjusting the position of the side walls of shroud 236 via various slots shown in shroud 236. Also shown is a chain gear 225, which is a component of chain drive 224 that drives rotary cutter 228. Trencher teeth 230 on rotary cutter 228 are visible, as are a pair of containment coulters 234. Also shown is a portion of a containment shield 221 positioned between each of the containment coulters 234. Containment shield 221 serves to catch any plant or soil material thrown toward the front of the cutting assembly by rotary cutter 228. The interior of containment shield 221 has the same curvature as the interior of shroud 236, and material contacting the interior surface of containment shield 221 is simply directed along the curvature of shroud 236 toward the rear of the device. Rotary cutter 228 rotates against the direction of travel of mulching machine 200, and the action of rotary cutter 228 directs soil and plant material upwardly and toward the back of the device. Some material may contact containment shield 221, or shroud 236, as described above, and is ultimately directed toward the rear of shroud 236 by the interior curvature thereof. Containment shield 221 and/or shroud 236 may also include a plastic liner (not shown) along the interior surface thereof. Finally, a pivot bracket 219 is shown in FIG. 21. Pivot bracket 219 engages a shaft (not shown) about which the cutting assembly can pivot when contacting an object in the plant bed that may damage the cutting assembly.

Figure 22:
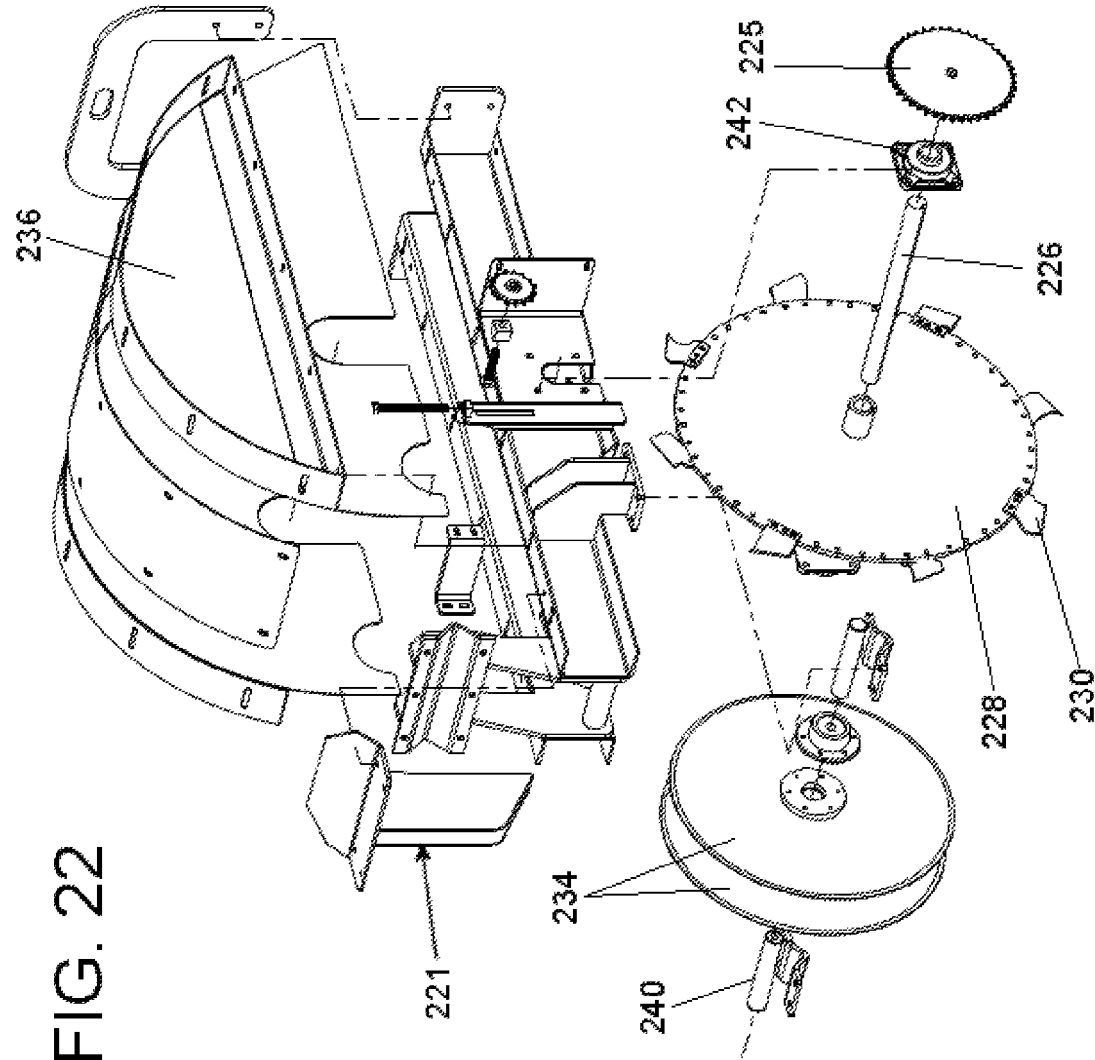
FIG. 22 is an exploded view of an embodiment of a cutting assembly according to the present invention.

FIG. 22 provides an exploded view of a cutting assembly according to the present invention. Various components of the cutting assembly described above are visible in the exploded view, such as containment shield 221, shroud 236, chain gear 225, rotary cutter 228, trencher teeth 230, and containment coulters 234. Also shown is a rotatable shaft 226 which engages chain gear 225 and rotary cutter 228. A bearing 242 is adapted for attachment to the cutting assembly, and rotatable shaft 226 extends therethrough to allow rotary cutter 228 to rotate. Each containment coulter 234 also has a shaft 240 associated therewith, which supports the respective containment coulter 234 on the cutting assembly. The spacing of containment coulters 234 can be adjusted by positioning a respective shaft 240 within its associated clamp.

It is to be understood that the foregoing description and accompanying drawings are exemplary and detail certain embodiments of a cutting mechanism of the present invention, and devices utilizing that mechanism. Various modifications to the embodiments shown and described will be readily apparent to those of skill in the art upon reading this disclosure, and such modifications are considered to be within the spirit and scope of the invention.

Having thus described the preferred embodiment of the invention, what is claimed as new and desired to be protected by Letters Patent includes the following:

1. A device for preparing a plant bed comprising:
   a frame comprising a forward end and a rearward end;
   a first containment coulter attached to said frame;
   a second containment coulter attached to said frame in side-by-side alignment with said first containment coulter, wherein a space is defined between the first containment coulter and the second containment coulter;
   a rotary cutter rotatably attached to said frame rearward of said first and second containment coulters, a portion of the rotary cutter extending into the space between the first and second containment coulters, the rotary cutter comprising a plurality of teeth disposed along a peripheral edge thereof; and
   a shroud attached to the frame and comprising a top extending over at least a portion of the first and second containment coulters and the rotary cutter, and first and second opposing side walls extending downward from the top along at least a portion of a height of the first and second containment coulters and the rotary cutter.

2. The device according to claim 1, wherein the first containment coulter, second containment coulter, rotary cutter, and shroud comprise a first cutting assembly,
   a third containment coulter attached to said frame;
   a fourth containment coulter attached to said frame in side-by-side alignment with said third containment coulter, wherein a space is defined between the third containment coulter and the fourth containment coulter;
   a second rotary cutter rotatably attached to said frame rearward of said third and fourth containment coulters, a portion of the second rotary cutter extending into the space between the third and fourth containment coulters, the second rotary cutter comprising a plurality of teeth disposed along a peripheral edge thereof; and
   a second shroud attached to the frame and comprising a top extending over at least a portion of the third and fourth containment coulters and the second rotary cutter, and first and second opposing side walls extending downward from the top along at least a portion of a height of the third and fourth containment coulters and the second rotary cutter,
   wherein said first cutting assembly is attached the frame at a first location therealong, and the second cutting assembly is attached to the frame at a second location therealong.

3. The device according to claim 2 further comprising a rotatable shaft engaging the first rotary cutter and the second rotary cutter and extending therebetween.

4. The device according to claim 3 further comprising a chain drive in operative engagement with said rotatable shaft, the chain drive for rotating said rotatable shaft.

5. The device according to claim 4 further comprising a gear box in operative engagement with said chain drive, the gear box adapted to engage a vehicle power take-off such that rotation of said rotatable shaft may be actuated by said vehicle power take-off.

6. The device according to claim 1 wherein each of the plurality of teeth of said rotary cutter has a shape and profile for scooping, carrying, and depositing soil and cut plant material.

7. The device according to claim 6 wherein said plurality of teeth are arranged in alternative left- and right-hand configuration along said peripheral edge of the rotary cutter.

8. The device according to claim 1 further comprising a first guide attached to an interior surface of said first side wall of said shroud, and a second guide attached to an interior surface of said second side wall of said shroud, said first and second guides extending along at least a portion of the length and at least a portion of the height of the first and second containment coulters and the rotary cutter.

9. The device according to claim 1 further comprising:
a conveyor attached to said frame rearward of said shroud, the conveyor disposed such that plant material removed by said rotary cutter and traveling through said shroud is disposed onto said conveyor; and
a grinder attached to said frame rearward of said conveyor and in communication with said conveyor such that plant material traveling along said conveyor is delivered into said grinder.

10. The device according to claim 1 further comprising:
at least one wheel rotatably attached to a wheel support attached to said frame.

11. The device according to claim 10 further comprising:
at least one hydraulic cylinder attached to said frame and said wheel support, said hydraulic cylinder operable to raise and lower said frame in relation to said at least one wheel.

12. The device according to claim 1, wherein the relative position on the frame of each of said first and second containment coulters is adjustable, thereby allowing adjustment of the space defined between said first and second containment coulters.

13. The device according to claim 1, wherein the distance between said first and second opposing side walls of said shroud is adjustable.

14. The device according to claim 1, wherein the first and second containment coulters, rotary cutter, and shroud comprising a cutting assembly having a forward end and a rearward end, and further wherein the forward end of said cutting assembly is detached from said frame and the rearward end of said cutting assembly is pivotably attached to said frame, thereby allowing the cutting assembly to pivot upward when the cutting assembly encounters an obstruction in a plant bed.

15. The device according to claim 1 further comprising a wheel pivotably attached to said frame and a hydraulic cylinder engaging said frame and said wheel, whereby the height of the frame in relation to said wheel can be adjusted via the hydraulic cylinder.

16. The device according to claim 1 wherein said shroud comprises a forward end and a rearward end, further comprising a containment shield fixedly attached to said shroud at the forward end thereof.

17. The device according to claim 14 wherein said cutting assembly is slidingly engaged with said frame to allow movement along a length thereof.

18. A method of preparing a plant bed, the method comprising the step of:
providing a device for preparing a plant bed, wherein the device, in a single pass, performs the steps of:
cutting plant material in the plant bed, the plant material selected from the group consisting of roots, runners, and crowns;
scooping soil and the cut plant material from the plant bed; and
discharging soil and cut plant material onto the plant bed behind the device,
said device comprising first and second containment coulters in side-by-side arrangement, a space defined between said containment coulters, a rotary cutter rearward of said containment coulters, and a shroud partially covering said containment coulters and said rotary cutter, wherein is the step of cutting plant material in the plant bed is performed by the containment coulters, the step of scooping the cut plant material from the plant bed is performed by the rotary cutter, and the step of discharging soil and cut plant material onto the plant bed is performed by the shroud.

* * * * *